(12) United States Patent
Oklejas, Jr. et al.

(10) Patent No.: US 10,933,375 B1
(45) Date of Patent: Mar. 2, 2021

(54) FLUID TO FLUID PRESSURIZER AND METHOD OF OPERATING THE SAME

(71) Applicant: FLUID EQUIPMENT DEVELOPMENT COMPANY, LLC, Monroe, MI (US)

(72) Inventors: Eli Oklejas, Jr., Newport, MI (US); Kevin L. Newcomer, Monroe, MI (US); Robert A. Oklejas, Monroe, MI (US)

(73) Assignee: FLUID EQUIPMENT DEVELOPMENT COMPANY, LLC, Monroe, MI (US)

( * ) Notice: Subject to any disclaimer, the term of this patent is extended or adjusted under 35 U.S.C. 154(b) by 0 days.

(21) Appl. No.: 16/995,136

(22) Filed: Aug. 17, 2020

Related U.S. Application Data

(60) Provisional application No. 62/894,186, filed on Aug. 30, 2019.

(51) Int. Cl.
*B01D 61/02* (2006.01)
*B01D 61/08* (2006.01)
(Continued)

(52) U.S. Cl.
CPC .......... *B01D 61/025* (2013.01); *B01D 61/08* (2013.01); *B01D 61/10* (2013.01); *B01D 61/12* (2013.01);
(Continued)

(58) Field of Classification Search
None
See application file for complete search history.

(56) References Cited

U.S. PATENT DOCUMENTS 2,526,618 A 10/1950 Georges
2,687,843 A 8/1954 Forster
(Continued)

FOREIGN PATENT DOCUMENTS

CN 2492001 Y 5/2002
CN 2539942 Y 3/2003
(Continued)

OTHER PUBLICATIONS

International Search Report and Written Opinon dated Nov. 11, 2020 in corresponding PCT Application No. PCT/US2020/048487.

*Primary Examiner* — Richard C Gurtowski
(74) *Attorney, Agent, or Firm* — Harness, Dickey & Pierce, P.L.C.

(57) ABSTRACT

A fluid to fluid pressurizer includes an elongated stationary portion comprising a plurality of flow channels, said stationary portion comprising a first face at a first end and a second face at a second end. A first and second rotor housing are disposed adjacent to the end of the elongated stationary portion and have a fluid inlet fluidically coupled to respective first and second annular channels. A first and second rotary valve plates are in the housings and have inlet valve ports coupling the fluid inlet to the plurality of flow channels and outlet valve ports fluidically coupling the flow channels to adjacent the rotor faces. The rotary valve plates have sealing surfaces adjacent the stator faces. Annular seals are disposed between the rotor housings and the rotary valve plate between the annular channels. A motor or motors rotate the rotary valve plates within the housings.

43 Claims, 21 Drawing Sheets

(51) Int. Cl.
*B01D 61/12* (2006.01)
*B01D 61/10* (2006.01)

(52) U.S. Cl.
CPC ...... *B01D 2313/04* (2013.01); *B01D 2313/18* (2013.01); *B01D 2313/24* (2013.01)

(56) References Cited

U.S. PATENT DOCUMENTS

| | | |
|---|---|---|
| 2,753,108 A | 7/1956 | Tihamer et al. |
| 2,970,745 A | 2/1961 | Max |
| 3,145,909 A | 8/1964 | Gardiner |
| 3,209,986 A | 10/1965 | Kentfield |
| 3,234,736 A | 2/1966 | Spalding |
| 3,291,379 A | 12/1966 | Alfred |
| 3,431,747 A | 3/1969 | Hashemi et al. |
| 3,489,159 A | 1/1970 | Cheng et al. |
| 3,498,427 A | 3/1970 | Bingley |
| 4,174,925 A | 11/1979 | Pfenning et al. |
| 4,288,326 A | 9/1981 | Keefer |
| 4,352,638 A | 10/1982 | Vallance |
| 4,360,316 A | 11/1982 | Rahnke |
| 4,360,317 A | 11/1982 | Vallance et al. |
| 4,887,942 A | 12/1989 | Hauge |
| 5,174,337 A | 12/1992 | Dahlen et al. |
| 5,178,521 A | 1/1993 | Ikeda et al. |
| 5,306,428 A | 4/1994 | Tonner |
| 5,725,758 A | 3/1998 | Chace et al. |
| 5,797,429 A | 8/1998 | Shumway |
| 6,116,851 A | 9/2000 | Oklejas, Jr. |
| 6,135,152 A | 10/2000 | Knapp |
| 6,139,740 A * | 10/2000 | Oklejas ............... B01D 61/022 210/321.66 |
| 6,164,331 A | 12/2000 | Sugita et al. |
| 6,345,961 B1 | 2/2002 | Oklejas, Jr. |
| 6,449,939 B1 | 9/2002 | Snyder |
| 6,537,035 B2 | 3/2003 | Shumway |
| 6,540,487 B2 | 4/2003 | Polizos et al. |
| 6,725,881 B1 | 4/2004 | Beswick et al. |
| 6,773,226 B2 | 8/2004 | Al-Hawaj |
| 7,207,781 B2 | 4/2007 | Shumway |
| 7,214,315 B2 | 5/2007 | Shumway |
| 7,306,437 B2 | 12/2007 | Hauge |
| 7,500,490 B2 | 3/2009 | Wagner |
| 7,799,221 B1 | 9/2010 | MacHarg |
| 7,828,972 B2 | 11/2010 | Ham et al. |
| 7,988,428 B1 | 8/2011 | MacHarg |
| 7,997,853 B2 | 8/2011 | Pique et al. |
| 8,075,281 B2 | 12/2011 | Martin et al. |
| 8,226,376 B2 | 7/2012 | Krosgsgard et al. |
| 8,308,444 B2 | 11/2012 | Andrews |
| 8,419,940 B2 | 4/2013 | MacHarg |
| 8,622,086 B2 | 1/2014 | Servin |
| 8,622,714 B2 | 1/2014 | Andrews |
| 9,011,688 B2 | 4/2015 | Takahashi et al. |
| 9,435,354 B2 | 9/2016 | Lehner et al. |
| 9,597,638 B2 | 3/2017 | Zhu |
| 9,945,216 B2 | 4/2018 | Ghasripoor et al. |
| 10,125,796 B2 | 11/2018 | Hauge |
| 10,138,907 B2 | 11/2018 | Pinto et al. |
| 10,240,794 B2 | 3/2019 | Shimo |
| 10,268,217 B2 | 4/2019 | Rodriguez |
| 10,309,426 B2 | 6/2019 | Lehner et al. |
| 2002/0146325 A1 | 10/2002 | Shumway |
| 2005/0167346 A1 | 8/2005 | Johnson et al. |
| 2006/0032808 A1 | 2/2006 | Hauge |
| 2006/0054223 A1 | 3/2006 | Baumgarten et al. |
| 2006/0159570 A1* | 7/2006 | Manole ............... F04C 18/321 417/440 |
| 2006/0245909 A1 | 11/2006 | Stover |
| 2007/0212231 A1 | 9/2007 | Bross et al. |
| 2009/0185917 A1 | 7/2009 | Andrews |
| 2009/0320925 A1 | 12/2009 | Nichols |
| 2010/0196152 A1 | 8/2010 | Pique et al. |
| 2011/0108484 A1 | 5/2011 | Liberman et al. |
| 2011/0176936 A1 | 7/2011 | Andrews |
| 2012/0257991 A1 | 10/2012 | Woodthorpe |
| 2014/0048143 A1 | 2/2014 | Lehner et al. |
| 2015/0288255 A1 | 10/2015 | Barker et al. |
| 2015/0343382 A1 | 12/2015 | Levitin et al. |
| 2016/0084269 A1 | 3/2016 | Hauge |
| 2016/0146229 A1 | 5/2016 | Martin et al. |
| 2018/0354861 A1 | 12/2018 | Elliot et al. |
| 2019/0277110 A1 | 9/2019 | Shampine |
| 2020/0041011 A1 | 2/2020 | Melhus |
| 2020/0054988 A1 | 2/2020 | Wagner et al. |

FOREIGN PATENT DOCUMENTS

| | | |
|---|---|---|
| CN | 101440828 A | 5/2009 |
| CN | 101504085 A | 8/2009 |
| CN | 201737788 U | 2/2011 |
| CN | 102527238 A | 7/2012 |
| CN | 103977708 A | 8/2014 |
| CN | 104948106 A | 9/2015 |
| CN | 105114368 A | 12/2015 |
| CN | 105540747 A | 5/2016 |
| CN | 105576863 A | 5/2016 |
| CN | 105692791 A | 6/2016 |
| CN | 106315764 A | 1/2017 |
| CN | 206190971 U | 5/2017 |
| CN | 107152422 A | 9/2017 |
| CN | 206468622 U | 9/2017 |
| CN | 109846347 A | 6/2019 |
| FR | 2891323 A1 | 3/2007 |
| GB | 712107 A | 7/1954 |
| JP | 6057348 B2 | 1/2017 |
| KR | 101453497 B1 | 11/2014 |
| WO | WO-2004111509 A1 | 12/2004 |
| WO | WO-2009/046429 A2 | 4/2009 |
| WO | WO-2009-151174 A1 | 12/2009 |
| WO | WO-2011-108790 A1 | 9/2011 |
| WO | WO-2013-12115 A1 | 1/2013 |

* cited by examiner

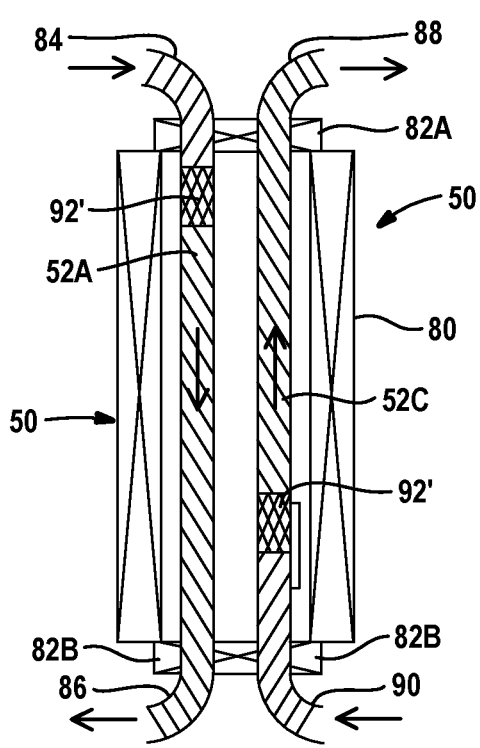
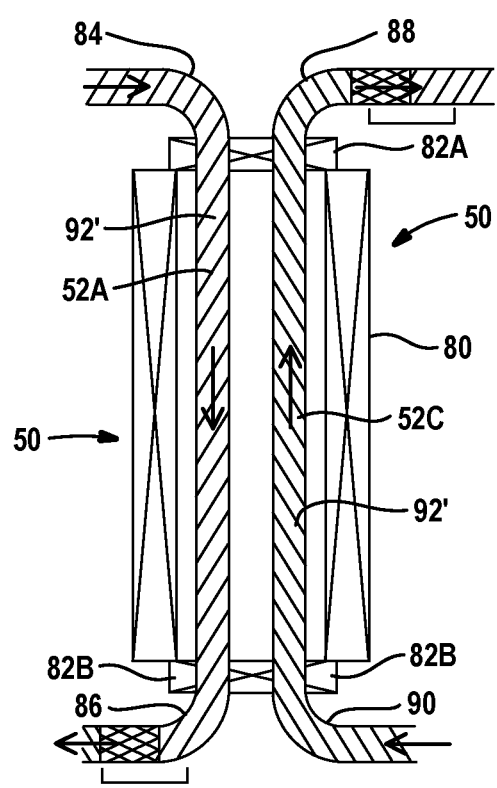
FIG. 4A
Prior Art
FIG. 4B
Prior Art

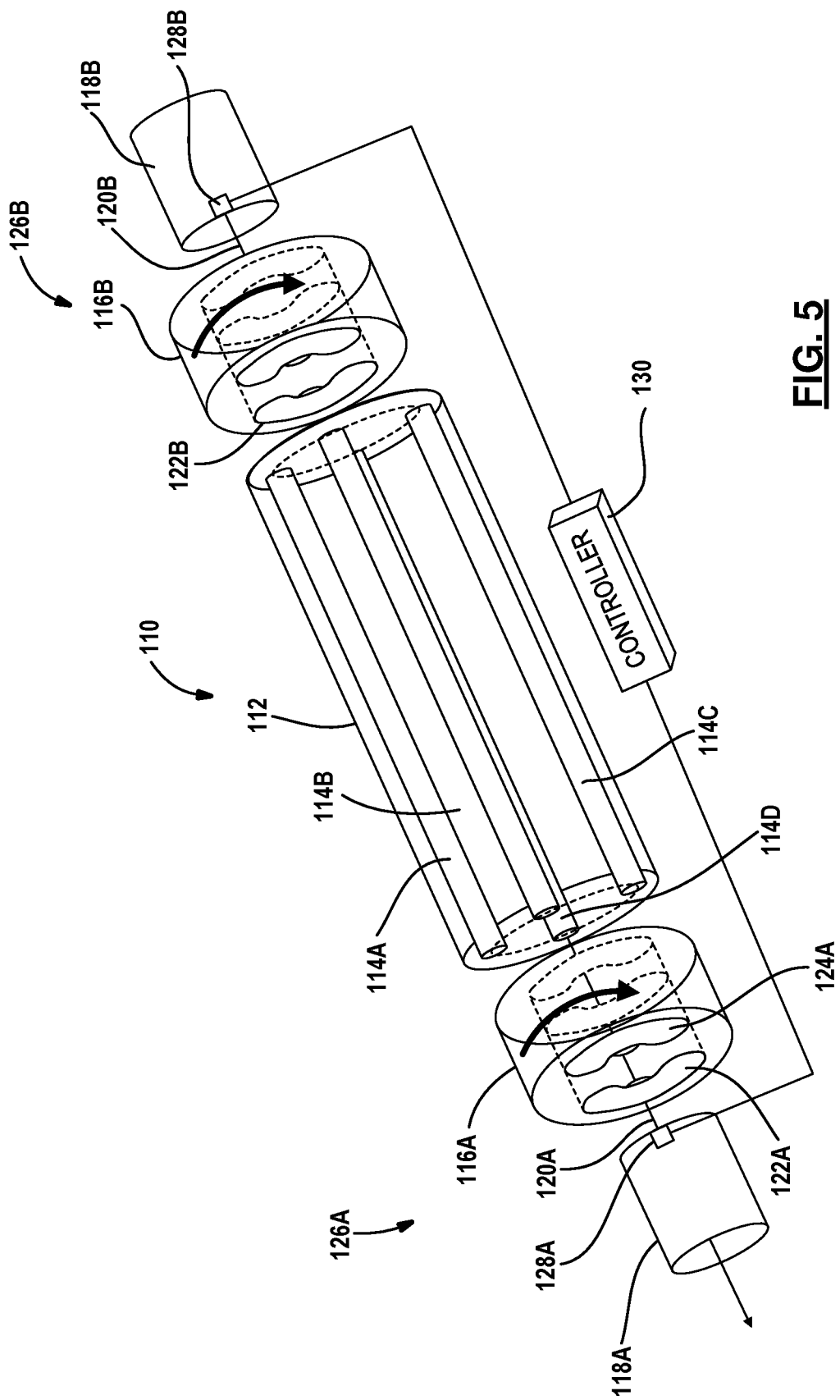

Section A-A

Section B-B

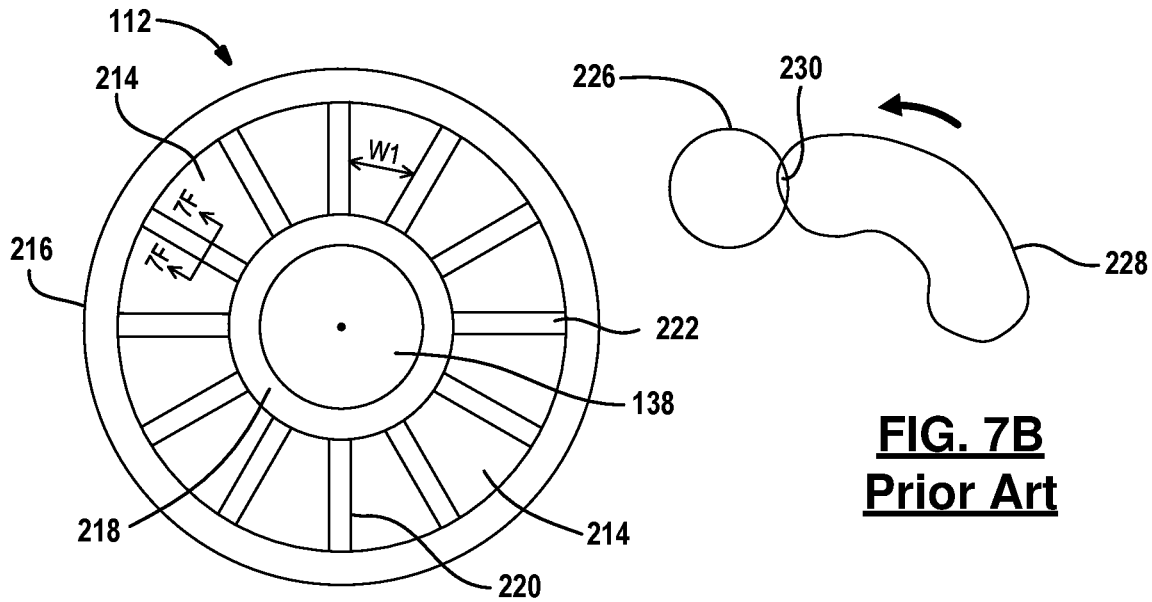
FIG. 7A
FIG. 7B
Prior Art
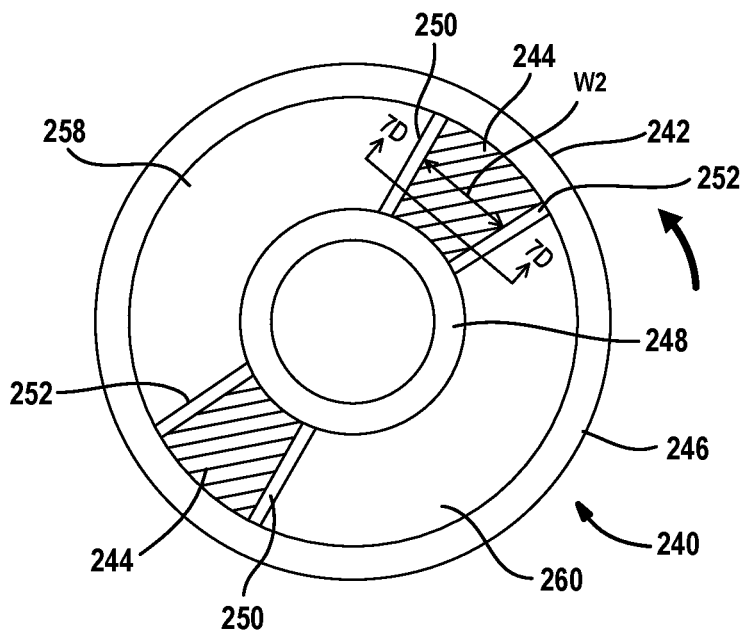
FIG. 7C

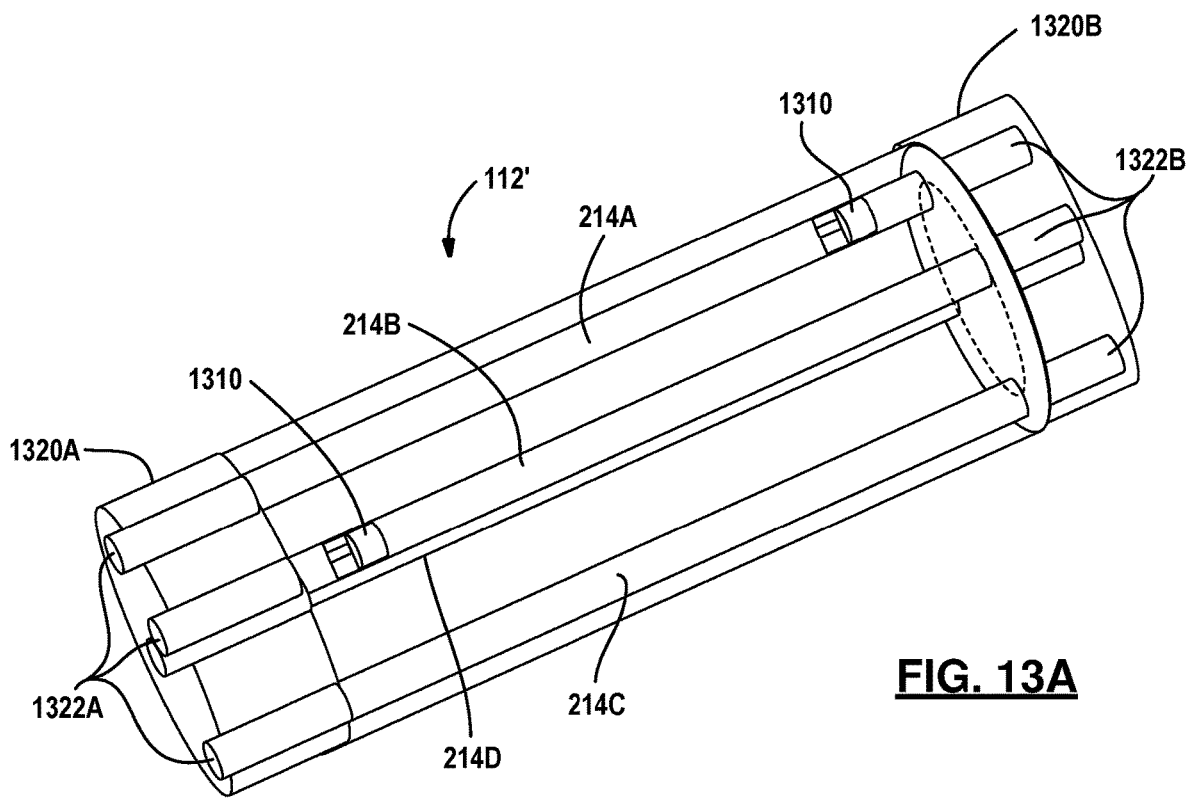
FIG. 13A
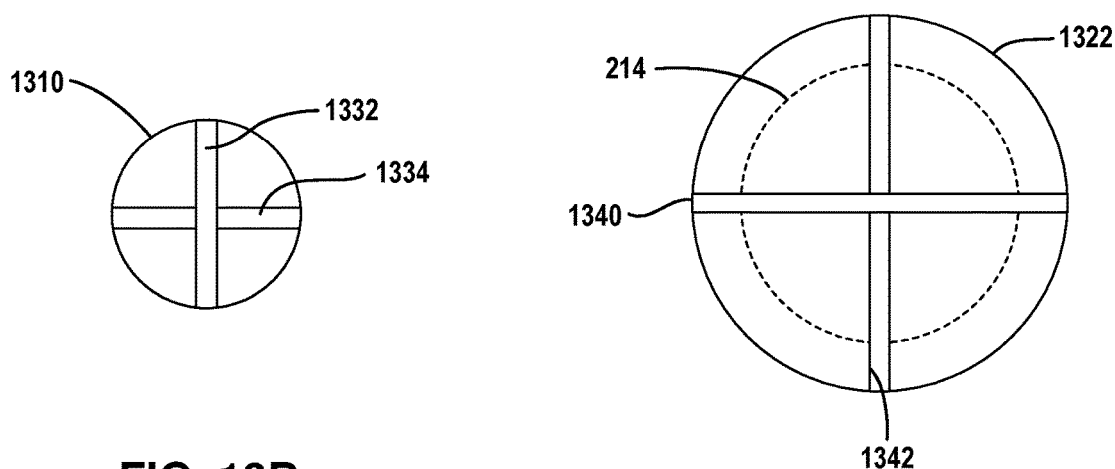
FIG. 13B
FIG. 13C

FLUID TO FLUID PRESSURIZER AND METHOD OF OPERATING THE SAME

CROSS-REFERENCE TO RELATED APPLICATION

This application is a non-provisional application of provisional application 62/894,186 filed Aug. 30, 2019. The disclosure of which is incorporated by reference herein.

TECHNICAL FIELD

The present disclosure relates generally to a rotating machine, and, more specifically, to fluid to fluid pressurizer that is used to transfer hydraulic energy from one stream to another.

BACKGROUND

The statements in this section merely provide background information related to the present disclosure and may not constitute prior art.

Various industrial processes require the use of highly pressurized streams for various purposes. Highly pressurized streams require a considerable amount of energy to increase the pressure of the stream. One example of a process includes reverse osmosis desalination which requires pressurization of a feed stream and depressurization of a brine stream. Another industrial process that requires highly pressurized streams includes liquid base absorbent gas purification systems. Gas purification systems pressurize a lean stream and depressurized a rich stream. Liquid based coolant systems depressurize coolant for use in lightweight heat exchangers and re-pressurize the fluid back to the process pressure. Without a type of energy recovery, such systems are highly expensive.

One example of an energy recovery device is a liquid driven turbocharger. Another example of an energy recovery device is a positive displacement fluid to fluid pressurizer that transfers the hydraulic energy from one fluid stream to another.

Referring now to FIG. 1, a reverse osmosis system 10 has a membrane chamber 12 that has a reverse osmosis membrane 14 disposed therein. The membrane chamber 12 has a feed fluid inlet 16 that receives feed fluid to be processed within the membrane chamber 12. Low pressure permeate exits the membrane chamber 12 through a permeate outlet 18. Brine exits the membrane chamber 12 through a brine outlet 19.

The feed at the fluid inlet 16 is highly pressurized. A low pressure feed pipe 20 provides load pressure feed fluid to a pump 22 which pressurizes the feed fluid to the process requirement and communicates the pressurized fluid to the feed fluid inlet 16.

Prior to the pump 22, a pipe 24 communicates fluid to an array of pressure transfer devices 26 from the feed pipe 20. The pressure transfer devices 26 are used to increase the low pressure of the feed fluid being communicated to the feed fluid inlet 16 to the process pressure using the high pressurized brine fluid from the brine outlet 19. High pressure brine enters the pressure transfer devices 26 through a high pressure inlet 32 and low pressure fluid leaves the pressure transfer devices 26 at the low pressure outlet 34. A flow meter 36 may be used to monitor the flow rate of the brine fluid through the pressure transfer devices 26. A control valve 38 leads to a drain 40.

The pipe 24 communicates low pressure feed to the pressure transfer devices 26. A high pressure outlet pipe 42 communicates fluid to the feed fluid inlet 16 through a pump 44 and a flow meter 46. By monitoring the flow meters 36, 46, the brine feed and the flow feed rates are controlled to be approximately the same. The pump 44 raises the pressure from the pressure transfer devices 26.

Referring now to FIG. 2, a pressure transfer device according to the prior art is set forth. The pressure transfer device 26 includes a rotor 50. The rotor 50 includes a plurality of parallel longitudinal flow channels 52A-52D. In this example, four flow channels 52A-52D are illustrated. The flow channels 52A-52D are set forth in a circular arrangement. Arrow 54 indicates the direction of rotation of the rotor 50. A pair of stators 56A, 56B are disposed adjacent to each end of the rotors 50. The stators 56A, 56B have valve plates 60A, 60B. The valve plate 60A has valve ports 62A, 64A. Valve plate 60B has valve ports 62B, 64B. Valve ports 62A, 62B are aligned through the flow channels 52A-52D during operation. Valve ports 64A and 64B are also aligned through the flow channels 52A-52D during operation. The alignment of the valve port 62A, 62B and 64A, 64B generate a fluid flow in the direction of the arrow 66A, 66B.

Between the valve ports 62A, 62B are seal areas 68A, 68B. The seal areas 68A, 68B are slightly wider than the width of the flow channels 52 within the rotor.

Referring now to FIGS. 3A and 3B, a housing 80 surrounds the rotor 50. The end plates 82A, 82B (end views of which are shown) are part of the stators 56A, 56B. The end plates 82A, 82B have the valve plates 60A, 60B incorporated therein. Likewise, the valve ports 62A, 62B, 64A, 64B are incorporated into the end plates 82A, 82B, respectively.

In this example, the valve port 62A is aligned with the inlet pipe 84, the flow channel 52A and the outlet pipe 86. The process starts presumably with fluid already within the flow channels 52A-52D. Low pressure fluid is provided through the pipe 84 such as from the feed pipe 20 in FIG. 1. The low pressure fluid pushes low pressure fluid out of the outlet pipe 86. The low pressure fluid is from the brine outlet 19. As is set forth, two different characteristics of the fluid are within the flow channel 52A, 52B. In this example of a reverse osmosis system, the fluid inlet pipe 84 provides a lower salinity fluid than the brine fluid from the brine outlet 19. Under certain flow conditions, the mixing area 82 remains small (has a lower length or volume).

Flow channel 52C receives high pressure fluid from the brine outlet 90 which, in turn, increases the fluid pressure of the feed fluid therein from the previous step. The valve port 64A, 64B and the longitudinal flow channel 52C are in alignment to obtain the fluid flow. As can be seen in FIG. 3B, the flow channels 52C, 52A have moved 180° in rotation. The rotation is created by the brine flow which enters the pumping channel with a tangential velocity component which imparts a torque on the rotor.

There are a number of disadvantages relative to the system illustrated in FIGS. 3A and 3B. That is, the rotor is required to be relatively compact so that the rotor can be easily rotated. That is, limited torque is available from the brine flow and therefore the size of the rotor 50 must be relatively compact. There is also very little control over when the brine/feed fluid interface 92 reaches the end of the flow channel. Cavitation may damage the openings and closings of the rotor channel with high pressure fluids depressurized to low pressure fluids in just a few milliseconds. Noise and rapid depressurization of fluid is among other disadvantages.

Referring now to FIG. 4A, another limitation of such systems is that the interface 92' may provide excessive mixing between the brine and the feed fluids. Because no physical barrier exists, diffusion and turbulence may create cross contamination between the two volumes. In FIG. 4A, the length of the contaminated interface 92' is significantly larger than that illustrated in FIGS. 3A and 3B. Even under the perfect conditions, cross contamination of about 5-6%.

Referring now to FIG. 4B, when the feed flow is too high or the brine flow is too low, or both, the fluid interface may be driven beyond the rotor 50. Extra feed fluid in the pipe 86 is less concern than the extra brine fluid in the feed pipe 88. This can reduce the overall efficiency of the system because the extra brine fluid will end up being communicated to the membrane chamber.

SUMMARY

In one aspect of the disclosure, a fluid to fluid pressurizer includes an elongated stationary portion comprising a plurality of flow channels, said stationary portion comprising a first face at a first end and a second face at a second end. A first and second rotor housing are disposed adjacent to the end of the elongated stationary portion and have a fluid inlet fluidically coupled to respective first and second annular channels. A first and second rotary valve plates are in the housings and have inlet valve ports coupling the fluid inlet to the plurality of flow channels and outlet valve ports fluidically coupling the flow channels to adjacent the rotor faces. The rotary valve plates have sealing surfaces adjacent the stator faces. Annular seals are disposed between the rotor housings and the rotary valve plate between the annular channels. A motor or motors rotate the rotary valve plates within the housings.

The present disclosure also concerns the following characteristics to be combined with claim 1 and with one or several of the other characteristics including the first rotary valve plate simultaneously couples a first plurality of plurality of flow channels to the fluid inlet and the second rotary valve plate simultaneously couples a second plurality of flow channels to the fluid outlet; the first plurality of flow channels and the second plurality of flow channels are symmetrically opposite about a longitudinal axis of the rotary plate; a motor shaft wherein the first motor is coupled to the first rotary valve plate and the second rotary valve plate with the motor shaft; a first motor shaft coupling the first motor and the first rotary valve plate and a second motor shaft coupling a second motor to the second rotary valve plate; the first motor shaft comprises a first encoder generating a first encoder signal and the second motor shaft comprises a second encoder generating a second encoder signal and a motor controller synchronously controlling the first motor and the second motor based on the first encoder signal and the second encoder signal; the plurality of flow channels are defined by a plurality of radial walls, an inner annular wall and an outer annular wall, said radial walls defining a first width for each of the plurality of flow channels; the rotary valve comprises a sealing area comprising a first radial sealing edge, a second radial sealing edge having a second width therebetween, said second width equal to or greater than the first width; the first radial sealing edge comprises a first taper extending therefrom, the sealing edge comprising an insert formed of a wear resistant material different than a port plate material; the first taper is linear; the first taper is curved; the insert is removable; the first radial sealing edge comprises a trailing edge and the second radial sealing edge comprises a leading edge, wherein the second radial sealing edge comprises a second taper; the rotary valve comprises a pair of oppositely disposed sealing areas comprising a first area; the sealing area comprises four diametrically opposite and evenly spaced apart sealing areas; the sealing area comprises a plurality of groups of four diametrically opposite and evenly spaced apart sealing areas; the first rotary valve plate comprises a first annular sealing portion, a second annular sealing portion spaced apart from the first annular sealing portion, said first radial sealing edge and said second radial sealing edge extending between the first annular sealing portion and the second annular sealing portion; the first annular sealing portion comprises a plurality of radially overlapping grooves; the plurality of radially overlapping grooves are radially extending; the plurality of radially overlapping grooves are disposed at angles relative to a radius; the plurality of radially overlapping grooves are one millimeter deep or less; the sealing area comprises a plurality of grooves disposed thereon; the sealing area comprises a first set of groves extending from the first sealing edge toward the second sealing edge and a second set of grooves extending from second sealing edge toward the first sealing edge; the first rotor housing further comprising a chamber disposed adjacent to the rotary valve plate, the chamber fluidically coupled to the inlet through a first control valve and wherein the chamber is fluidically coupled to the fluid outlet through a second control valve, a controller coupled to the first control valve and the second control valve controlling a fluid pressure within the chamber; the fluid pressure within the chamber provides an axial force of on the rotor toward the stationary portion; the plurality of flow channels comprises a first flow channel end portion having a first cross sectional area a second flow channel end portion having a second cross sectional area and a middle flow channel portion having a third cross sectional area, said middle cross sectional area less than the first cross sectional area and the second cross sectional area; the middle flow channel portion comprises a movable partition disposed therein; the first flow channel end portion comprises a partition stop spaced apart from the middle flow channel portion allowing the movable partition to partially extend therefrom; the first flow channel end portion comprises a first partition stop disposed in the first flow channel end portion and a second partition stop disposed in the second flow channel end portion; the first partition stop is disposed closer to the middle portion than the second partition stop; the movable partition has a first end position adjacent the first partition stop and a second end position adjacent the second partition stop, in the first end position fluid flow the flow channel is blocked and, in the second end position, fluid flow through the flow channel is partially block; the stationary portion comprises a first removable faceplate and a second removable faceplate; the first flow channel end portion is disposed in a first removable faceplate and the second flow channel end portion is disposed in a second removable faceplate; the partition comprises a guide fin; the plurality of flow channels comprises a plurality of pipes coupled to a first pipe manifold and a second pipe manifold; the plurality of pipes are coupled to the first pipe manifold at a plurality of pipe joints and, the rotary valve plate housing is coupled to the first pipe manifold.

In another aspect of the disclosure, a reverse osmosis system has a membrane chamber has a feed fluid inlet, a permeate outlet and brine outlet. A fluid to fluid pressurizer as recited to claim 1 is disposed in the reverse osmosis system. The first rotor housing is fluidically coupled to the feed fluid inlet of the membrane chamber and the second rotor housing is coupled to the brine outlet. A first flow rate sensor generates a brine flow rate signal and a controller coupled to the first flow rate sensor controls a speed of the motor in response to the brine flow rate.

The present disclosure also concerns the following characteristics to be combined with claim 1 and with one or several of the other characteristics including a salinity sensor coupled to a fluid outlet of the first rotor housing generating a salinity signal corresponding to a salinity of the fluid from the fluid outlet; and controller coupled to the motor and the salinity sensor, the controller controlling a motor speed of the motor in response to the salinity signal.

In yet another aspect of the disclosure, a method of operating a fluid to fluid pressurizer having an elongated stationary portion comprising a plurality of flow channels, a first face at a first end and a second face at a second end, a first stationary rotor housing disposed adjacent to the first end of the elongated stationary portion and comprising a first rotary valve plate therein, a second stationary rotor housing disposed adjacent the second end of the stationary portion comprising a second rotary valve plate therein includes communicating low pressure feed fluid to the fluid to fluid pressurizer, communicating high pressure process fluid to the fluid to fluid pressurizer, rotating the first rotary valve plate and the second rotary vale plate within the first stationary rotor housing and the second stationary rotor housing synchronously so that low pressure feed fluid is pressurized by the high pressure process fluid within the plurality of flow channels to form high pressure feed fluid and controlling a speed of rotating in response to a sensed condition in the high pressure feed fluid or a high pressure process fluid.

The present disclosure also concerns the following characteristics to be combined with the method and with one or several of the other characteristics including controlling the speed of rotating comprises controlling the speed of rotating in response to a salinity of the high pressure feed fluid, controlling the speed of rotating comprises controlling the speed of rotating in response to a flow rate of the high pressure process fluid and rotating the first rotary valve plate and the second rotary vale plate within the first stationary rotor housing and the second stationary rotor housing synchronously comprising rotating the first rotary valve plate and the second rotary vale plate within the first stationary rotor housing and the second stationary rotor housing synchronously based on a signal from a first encoder and a second encoder.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4A is a side view of a fluid pressurizer having a large mixing zone according to the prior art.

FIG. 4B is a side view of a fluid to fluid pressurizer according to the prior art having blow through of the fluid to fluid interface.

FIG. 5 is a perspective view of a fluid to fluid pressurizer according to the present disclosure.

FIG. 7A is an end view of a stator of the present disclosure.

FIG. 7B is a view of a prior art port and flow channel.

FIG. 7C is an end view of the rotary valve plate of the present disclosure.

FIG. 13A is a perspective view of an alternate design for a stator having a fluid partition therein.

FIG. 13B is an end view of the partition.

FIG. 13C is a side view of bars for preventing the partitions from exiting the channel.

DETAILED DESCRIPTION

Figure 1:
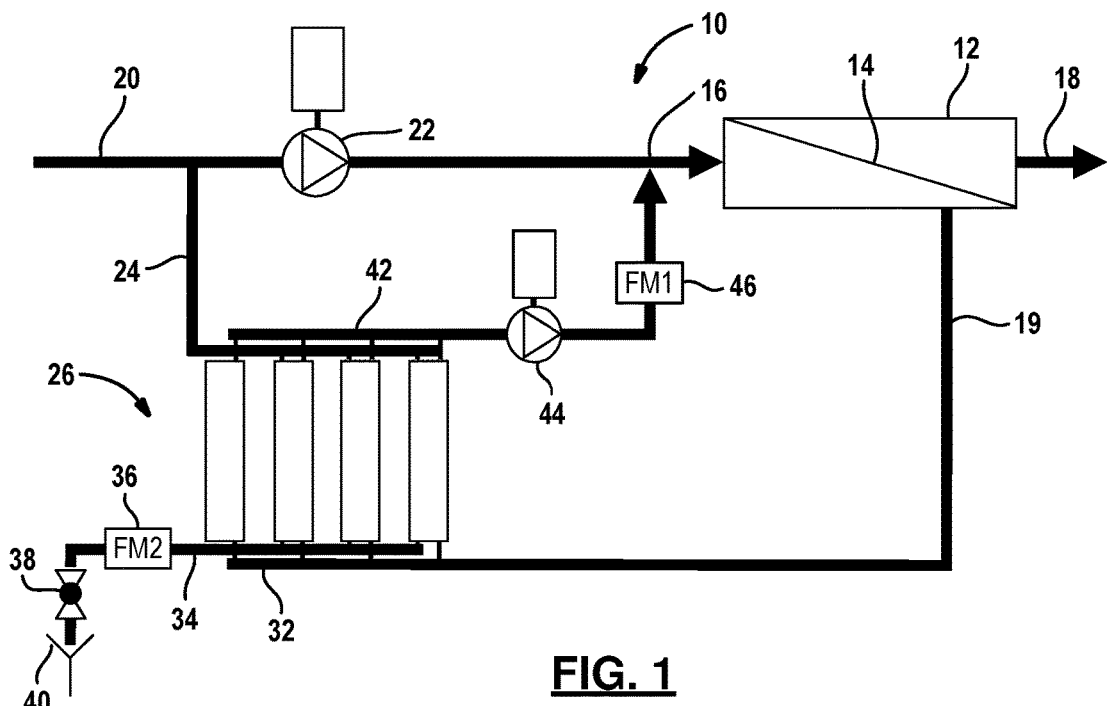
FIG. 1 is a schematic view of a reverse osmosis system according to the prior art.
Figure 2:
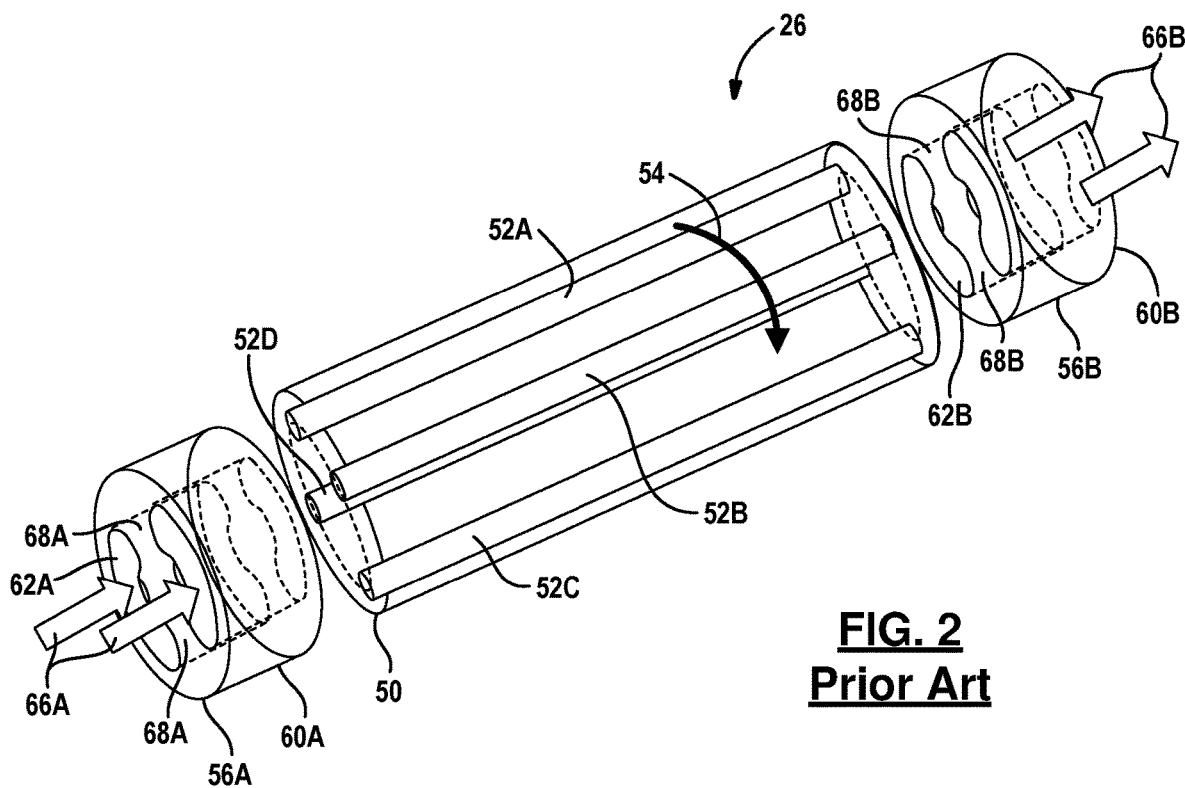
FIG. 2 is a perspective view of a fluid to fluid pressurizer according to the prior art.
Figures 3A, 3B:
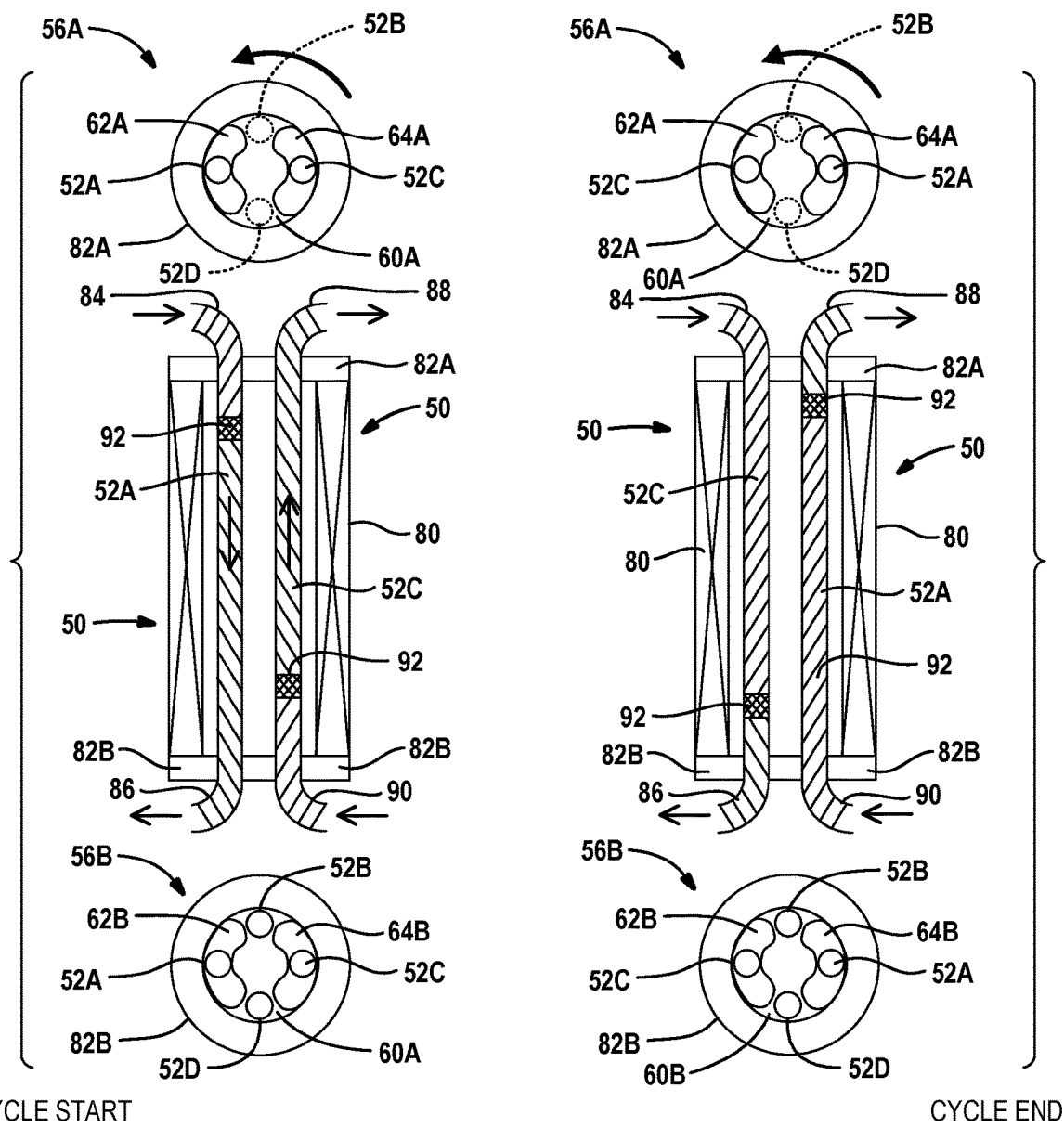
FIG. 3A is a side and end view of the fluid pressurizer of FIG. 2 according to the prior art.
FIG. 3B is a side view of fluid pressurizer in a second operating position according to the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Referring now FIG. 5, a fluid to fluid pressurizer 110 according to a first example of the disclosure is set forth. The fluid to fluid pressurizer 110 has a stator 112 with a plurality of flow channels 114 passing therethrough. In this example, flow channels 114A, 114B, 114C, 114D are illustrated having circular cross sections. However, various shapes of cross sections may be provided. For example, rectangular, trapezoidal or various other shapes may be used for the cross sectional area. As will be illustrated and described in further detail below, arc shaped segments may also be used.

Rotary valve plates 116A, 116B are coupled to a respective motor 118A, 118B through a respective shaft 120A, 120B. The rotary valve plates 116A, 116B comprise respective valve ports 122A, 122B and 124A, 124B. Thus, the rotary valve plates 116A, 116B and the valve ports 122A, 122B, 124A, and 124B form rotors 126A, 126B. In this example, two motors 118A, 118B are provided. However, as set forth below, only one motor with one common shaft need be provided. When using more than one shaft, synchronization between the movement of the rotors 126A, 126B is important to provide the proper fluid flow. Encoders 128A, 128B are provided at or near the shaft of each motor 118A, 118B. Each encoder 128A, 128B generates an encoder signal that is communicated to a controller 130. The encoder signal corresponds to the rotational (angular) position of each shaft and therefore the rotational position of each rotary valve plate 116A, 116B. The encoders 128A, 128B may also be located on the rotary valve plates 116A, 116B or rotors 126A, 126B. The controller 130 may be a programmable logic controller. The controller 130, based on the encoder signals from the encoders 128A, 128B, controls the rotation speed of the motors 118A, 118B. The motors 118A, 118B, together with the movement detection of the rotors, allows precise control of the position. Although continuous movement may be used, stepped movement may also be used.

In the example set forth in FIG. 5, size and capacity restraints are minimized. That is, the flow channels 114A-114D may be as large as desired. The stator 112, as illustrated below, does not need a housing or massive high precision bearings. By allowing the stator to be as long as desired, a greater pumping volume in each channel is achieved. The motors 118A, 118B can overcome the drag torque that may be induced by debris in the process stream which could stall the rotor in prior configurations. It should be noted that the internal valve plate configuration is illustrated in FIG. 5 with no housing.

Figure 6A:
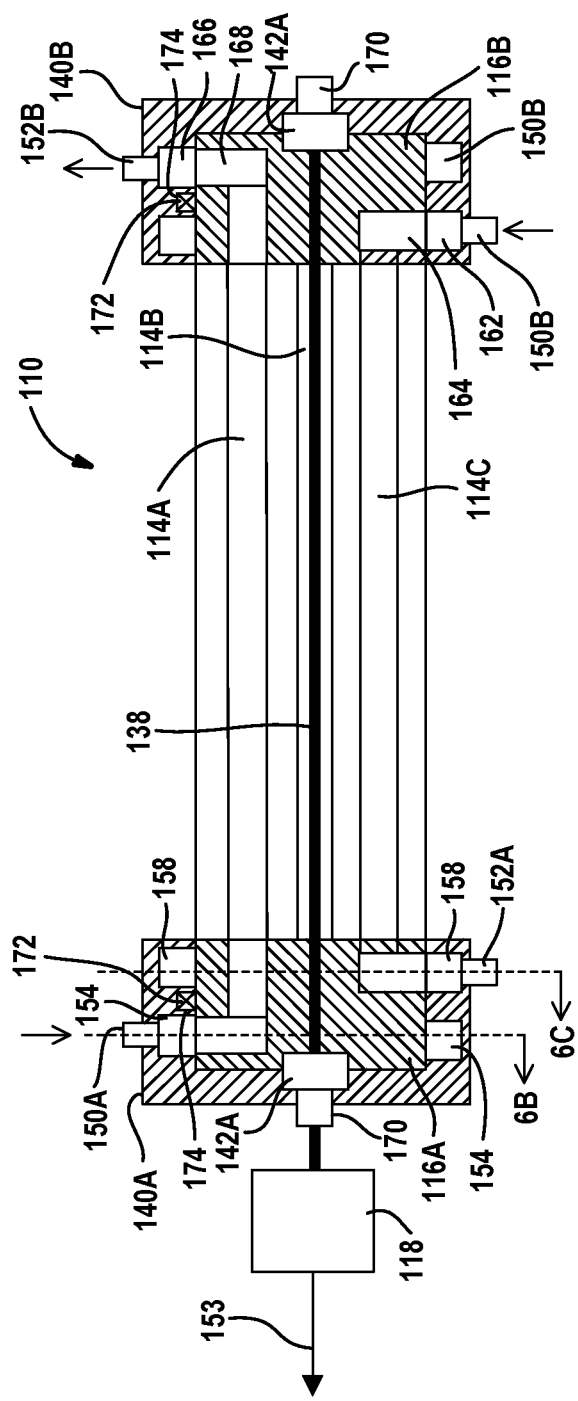
FIG. 6A is a cross-sectional view of a fluid to fluid pressurizer within the housings according to the present disclosure.
Figure 6B:
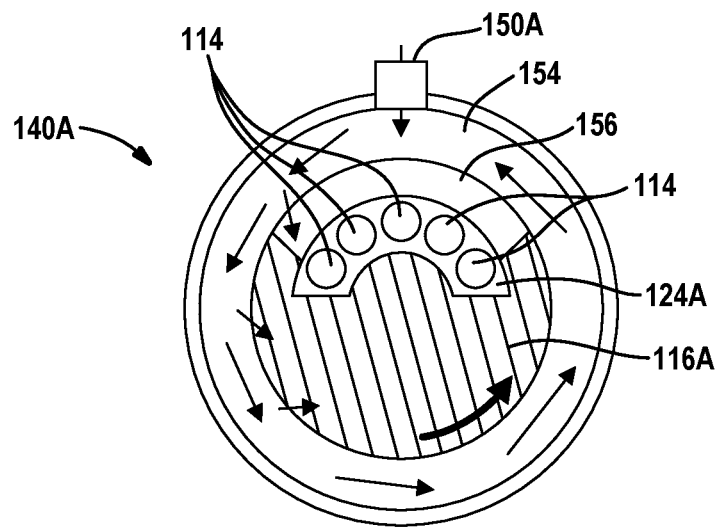
FIG. 6B is a cross-sectional view of the inlet of the housing of FIG. 6A.
Figure 6C:
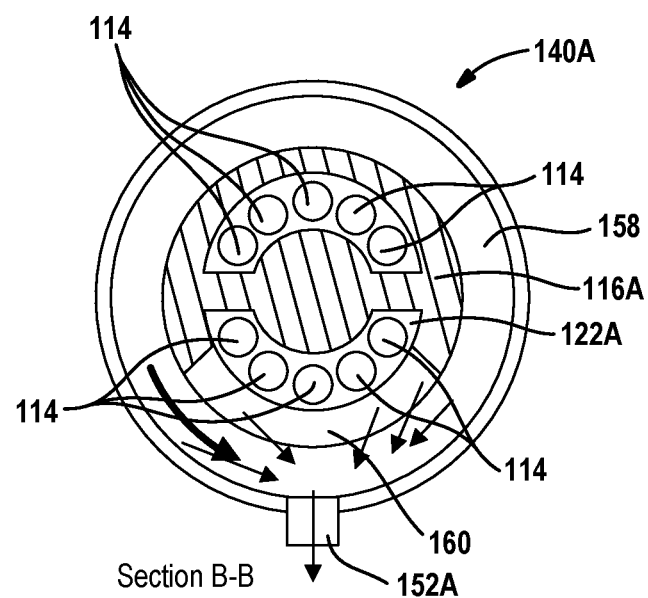
FIG. 6C is a cross-sectional view of the outlet of the housing of FIG. 6A.

Referring now to FIG. 6, more specific details of the fluid to fluid pressurizer 110 is set forth. In this example, a common shaft 138 is rotatably coupled to the rotary valve plates 116A, 116B. The common shaft 138 is supported by a first rotor housing 140A and a second rotor housing 140B disposed around the rotary valve plates 116A, 116B. A pair of bearings 142A, 142B allow the shaft 138 to rotate relative to the rotor housings 140A, 140B. The rotor housings 140A, 140B remain stationary during operation while the rotary valve plates 116A, 116B rotate therein.

Referring now also to FIGS. 6A and 6B, details of the rotor housing 140A is set forth. However, the details for rotor housing 140B are similarly configured. The rotor housing 140A has a fluid inlet 150A. Rotor housing 140B has a fluid inlet 150B. Rotor housing 140B has a fluid inlet 150B and a fluid outlet 152B. The flow inlets 150A, 150B and fluid outlets 152A, 152 are radial or perpendicular to a longitudinal axis 153 and the fluid to fluid pressurizer 110. In FIG. 6A, the fluid inlet 150A and the fluid outlet 152B are linearly aligned through the flow channel 114A. Also, in this example, the fluid inlet 150A and the fluid outlet 152B are located toward the axial ends of the respective rotor housings 140A, 140B. The fluid outlet 152A and the fluid inlet 150B are located radially inwardly from the respective fluid inlet 150A and fluid outlet 152B. However, those skilled in the art will appreciate that the relative positions of the fluid inlets 150A, 150B and the fluid outlets 152A, 152B may be changed on one or either end.

The fluid inlet 150A is fluidically coupled to annular channel 154. The annular channel 154 is fluidically coupled to the valve port 124A through a fluid passage 156. The fluid passage 156 is formed as part of the rotary valve plate 116A. In this example, five flow channels 114 are in alignment with the valve port 124A. As the rotary valve plate 116A rotates, the fluid passage 156 and the valve port 124 rotate. Fluid from the fluid inlet 150A is communicated to different flow channels 114 through the rotary valve plate 116A as the angle of the rotary valve plate 116A changes within the rotor housing 140A.

The fluid outlet 152A is fluidically coupled to an outlet annular channel 158. The outlet annular channel 158 is fluidically coupled to the valve port 122A through fluid passage 160. That is, fluid passing from the flow channels 114 is communicated through the fluid passage 160, the outlet annular channel 158 and the fluid outlet 152A. The valve port 124A is open to some of the flow channels 114 that are opposite to the flow channels 114 opened by the valve port 124A.

The rotor housing 140B includes an inlet annular channel 162, fluid passage 164, an outlet annular channel 166 and a fluid passage 168 that operate similarly to the components of the rotor housing 140A.

The examples illustrated in FIGS. 5 and 6 allow the motor 118 or motors 118A, 118B to be controlled to rapidly rotate the rotary valve plates 116A, 116B with the motor 118 to allow the flow channels to pressurize fluid. This allows an increase capacity of a given unit as a greater fraction of the fill cycle using fully open valve ports.

A shaft seal 170 prevents leakage from around the shaft 138. The materials of the rubbing surfaces of the stator and the rotary valve plates may be non-galling with a low co-efficient of friction. Suitable materials include, but are not limited to, ceramics such as silicon carbide or alumina.

Another seal such as annular seal 172 is incorporated within the first rotor housing 140A and the second rotor housing 148B. The seal 172 may be incorporated within a channel 174. The seal 172 may be an annular close clearance ring with limited leakage or a face seal, such as a mechanical seal, with virtually no leakage.

Referring now to FIG. 7A, a front view of a face 222 of the stator 112 is set forth. In this example, the flow channels 114 illustrated above have been reshaped as flow channels 214. The flow channels 214 comprise an annular outer wall 216, an annular inner wall 218, and a plurality of radial walls 220. Thus, the outermost wall of each segment is an arc portion of the annular outer wall 216. The inner wall of each flow channel 214 is an arc segment of the annular inner wall 218. The radial walls 220 connect the arc segments. The radial walls 220 may have equal widths so that the area defined between the walls is constant. Also, the face 222 of the stator 112 is manufactured with a high degree of flatness to facilitate sealing with the adjacent rotary valve plate. The common shaft 138 is disposed within the annular inner wall 218.

Referring now to FIG. 7B, a prior art configuration showing a channel 226 and a port 228 are illustrated. Typically, the surfaces of the prior art are curved such that an overlap area 230 is a small area initially. Because of the small initial area, all of the compressive fluid energy is expended rapidly in the small area 230 which disadvantageously increases the potential for erosion and cavitation.

Figure 7D:
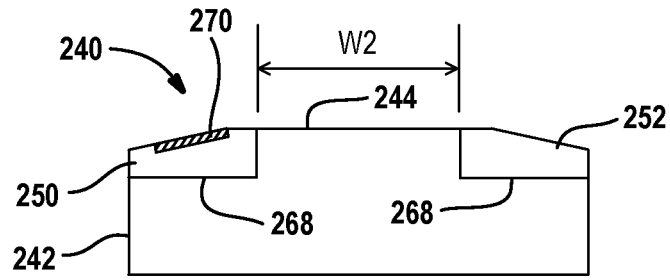
FIG. 7D is a side view of the rotary valve plate.

Referring now to FIGS. 7A, 7C and 7D, the sealing side 240 of a rotary valve plate 242 is illustrated. In this example, two sealing areas 244 are set forth. The sealing areas 244 are defined between an annular outer wall 246 and an annular inner wall 248. The sealing areas 244 are thus an arc shaped area that is sized to completely cover one or more of the flow channels 214. When covering one flow channel, the width W1 of the flow channel is the same or slightly less than the width W2 of the sealing areas 244. The sealing areas 244 has a first radial sealing edge 250 and a second radial sealing edge 252. The first radial sealing edge 250 may correspond to the trailing radial sealing edge and the second radial sealing edge 252 may correspond to the leading sealing edge, relative to rotation. As illustrated best in FIG. 7D, the first radial sealing edge 250 is shaped to form a linear angle angling away from the sealing areas 244. Likewise, the second radial sealing edge also has a surface that is linear.

Figure 7E:
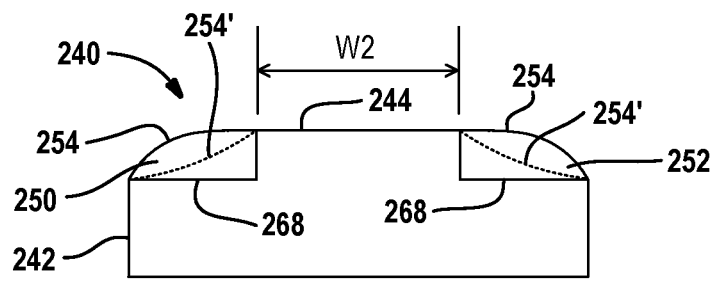
FIG. 7E is a side view of an alternate configuration for the rotary valve plate.

Referring now to FIG. 7E, as well, the first radial sealing edge 250 and the second radial sealing edge 252 may have a shaped or curved surface 243. The amount of curvature can be tapered depending upon the desired characteristics of the system. The curved surface 254 may be convex. Alternatively, a curved surface 254' that is concave maybe used.

The space between a first radial sealing edge 250 and a second radially sealing edge 252 adjacent sealing areas 244 form valve ports 258, 260. The valve ports 258, 260, when in motion, cross the flow channels 214 and thus a change in pressure in the stator channel is achieved. When the rotation carries the rotary valve plate 242 and thus one of the ports 258, 260 fluid flows into the channel. Fluid enters the flow channels as one end is connected to a high pressure source and the other to the high pressure process until the channel has been fully pressurized which may take only several milliseconds. Because all fluid is compressible, a high velocity flow into the channel compresses the fluid to match the pressure in the ports. The initial flow velocity is very high (up to 1000 psi differential for reverse osmosis applications) to the point of generating erosion at the edges of port plates. The change in pressure is most destructive when a high pressure channel is being depressurized as fluid cavitation is more likely to occur. The total compressive energy in a stator channel is directly proportional to the volume and pressure of the channel. Dissipation of compressive energy with minimal wear and stress is best accomplished by dissipating the energy over a large surface to minimize local concentrations over a long period of time. The shaped radially sealing edges maximize the extent of the area for depressurization and thus erosion and cavitation is significantly reduced.

Figure 7F:
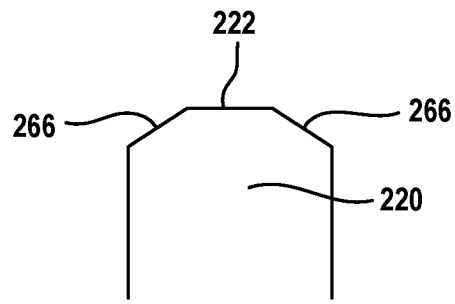
FIG. 7F is a cross-sectional view of a radial wall of the stator.

Referring now to FIG. 7F, the radial walls 220 of the stator 112 are illustrated with a shaped surface 266. Both the leading edges and trailing edges may be shaped edges. One or both edges may be linear or ramped while one or both may be curved or ramped.

Referring back to FIG. 7D, the first radial sealing edge 250 and the second radial sealing 252 may be formed from an insert 268. The insert 268 may be replaceable and thus changed when reduced performance is observed. A rough patch or irregular area 270 may be formed on the surface of the insert to help reduce cavitation. An insert may also be used on the surfaces 266 of FIG. 7F.

Figure 8A:
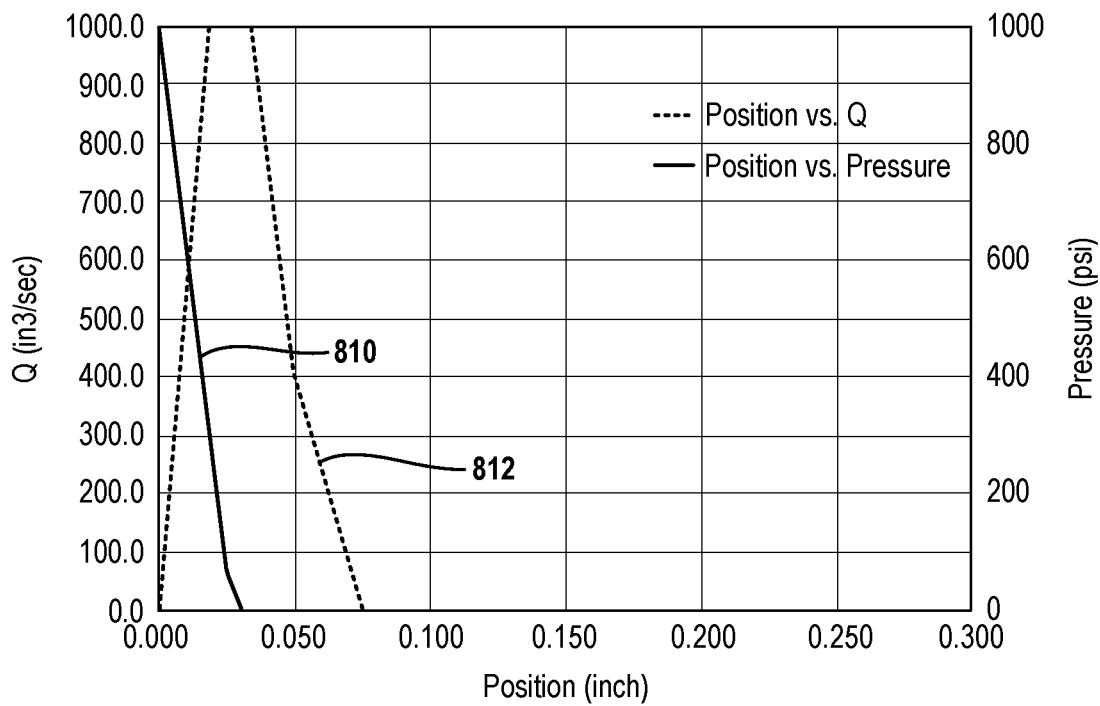
FIG. 8A is a flow rate and position plot for a channel pressure from high to low.

Referring now to FIG. 8A, the purpose of the taper is to produce a relatively gradual pressure change and flow velocity that is relatively low at any time during transition across the seal edge. A calculated change in the pressure channel from a high value to a low value is illustrated. The very fast drop in the pressure shows a change in pressure drop at 810 relative to the flow rate at 812.

Figure 8B:
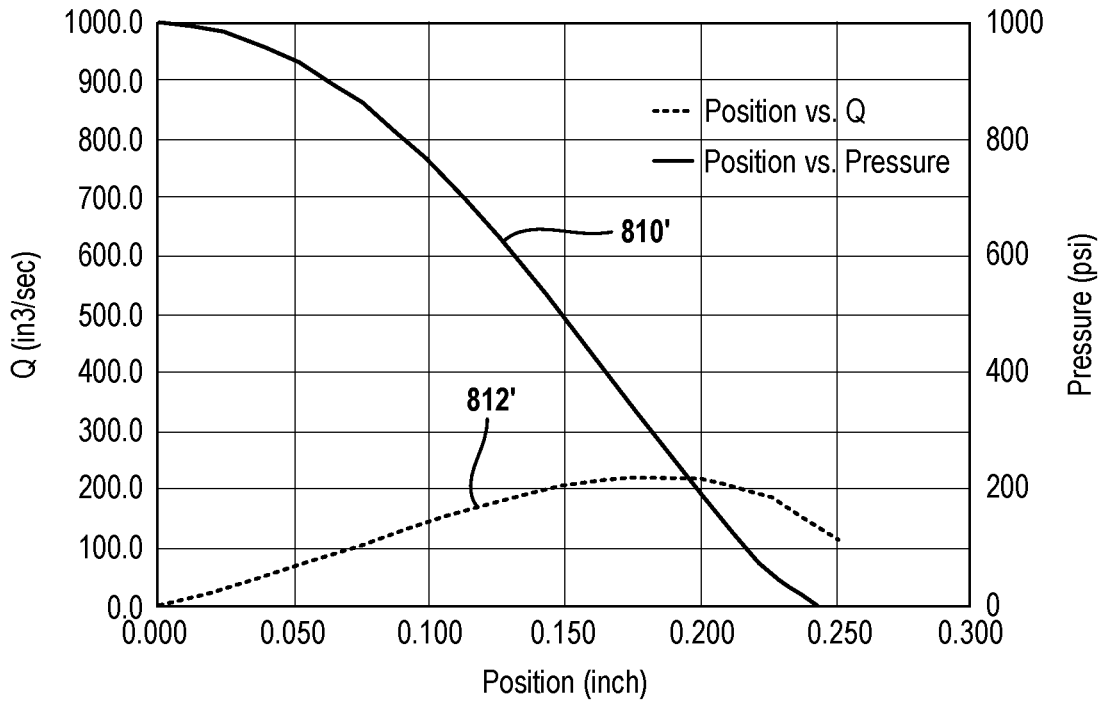
FIG. 8B is a similar plot with a changed geometry illustrating a greater distribution of the pressure.

Referring now to FIG. 8B, a taper that measures 0.25 inches in width and tapers 0.005 inches over the width is illustrated. The maximum flow rate is less than 15% compared with a sharp corner and the pressure change is spread over a much longer duration. The rate of wear and potential cavitation is thus greatly reduced. Since the maximum seal length is used, the energy is dissipated over a much great area compared with prior art. The noise and vibration associated with such a channel opening is greatly reduced. The pressure drop is illustrated at 810' and the position versus the flow rate is illustrated at 812'.

Figure 9A:
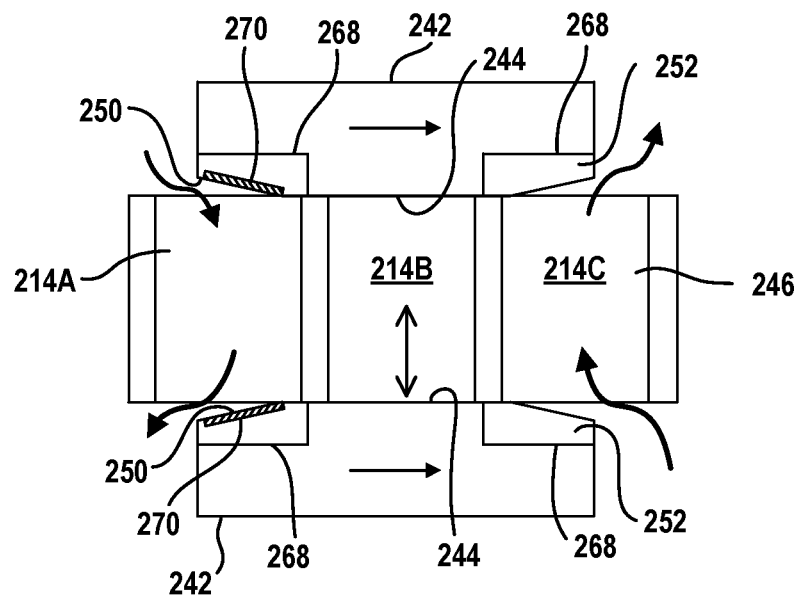
FIG. 9A is side view of the rotors relative to the stator in a first position.

Referring now to FIGS. 9A-9E, a sequence showing the rotary valve plate 242 moving relative to the stator and the flow channels 214 disposed therein. In FIG. 9A, flow channel 214C is communicating high pressure fluid therethrough, flow channel 214B is completely sealed and flow channel 214B is discharging low pressure fluid.

Figure 9B:
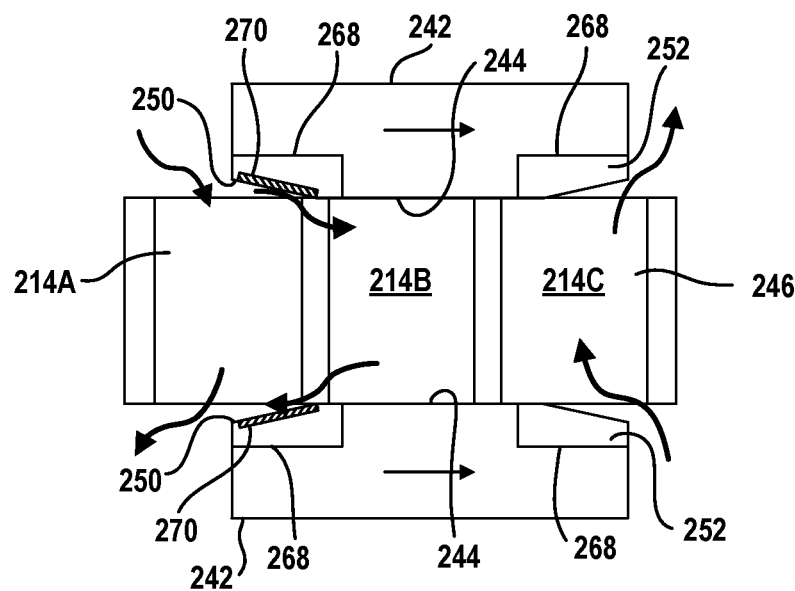
FIG. 9B is side view of the rotors relative to the stator in a second position.
Figure 9C:
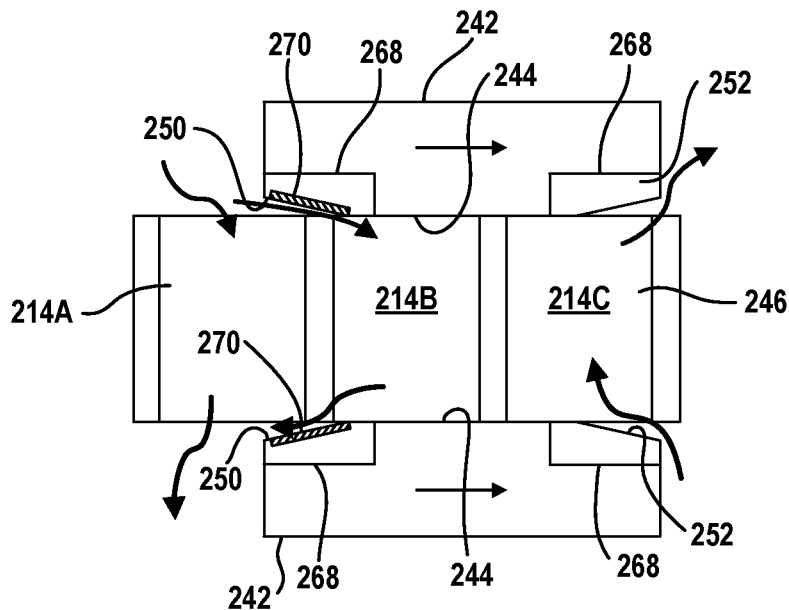
FIG. 9C is side view of the rotors relative to the stator in a third position.
Figure 9D:
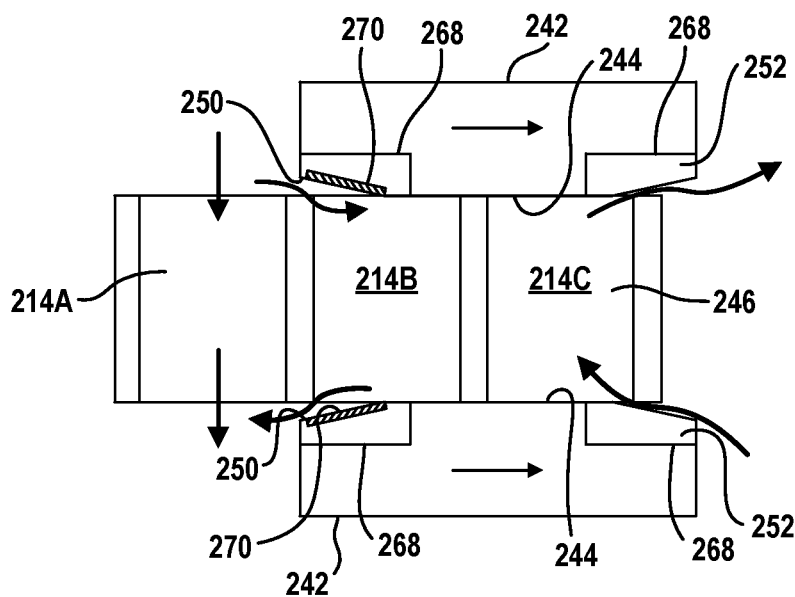
FIG. 9D is side view of the rotors relative to the stator in a fourth position.

In FIG. 9B, the flow channel 214B is just entering the tapered area on the trailing edge of the seal area 244. Fluid is just starting to leak through the small gap 910 at the start of the first radial sealing edge 250. The gap 910 is initially very small and creates a great deal of frictional resistance relative to flow area resulting in a reduced velocity. The area 270 may be a rough or a regular surface that is used to increase the friction drag resulting in the reduced flow velocity and reducing the potential for cavitation. As the clearance increases, the effect of the roughness diminishes, thereby reducing resistance for the last portion of the channel depressurization. This is illustrated in FIG. 9C. In FIG. 9D, uninhibited flow through flow channel 214A is achieved. The gap 910 opens further to allow more flow through the flow channel 214B.

Figure 9E:
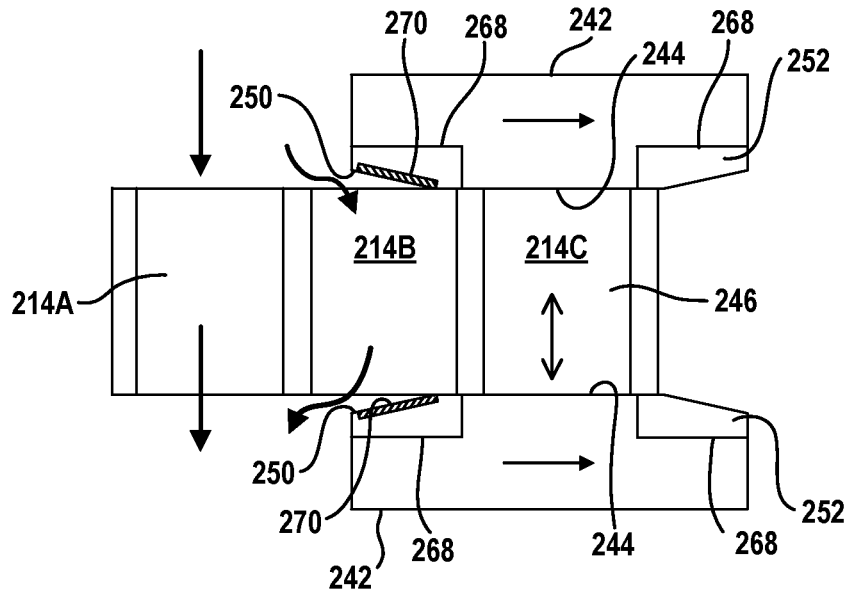
FIG. 9E is side view of the rotors relative to the stator in a fifth position.

In FIG. 9E, the flow channel 214C is completely sealed and flow is achieved through flow channels 214A and 214B.

Figure 10A:
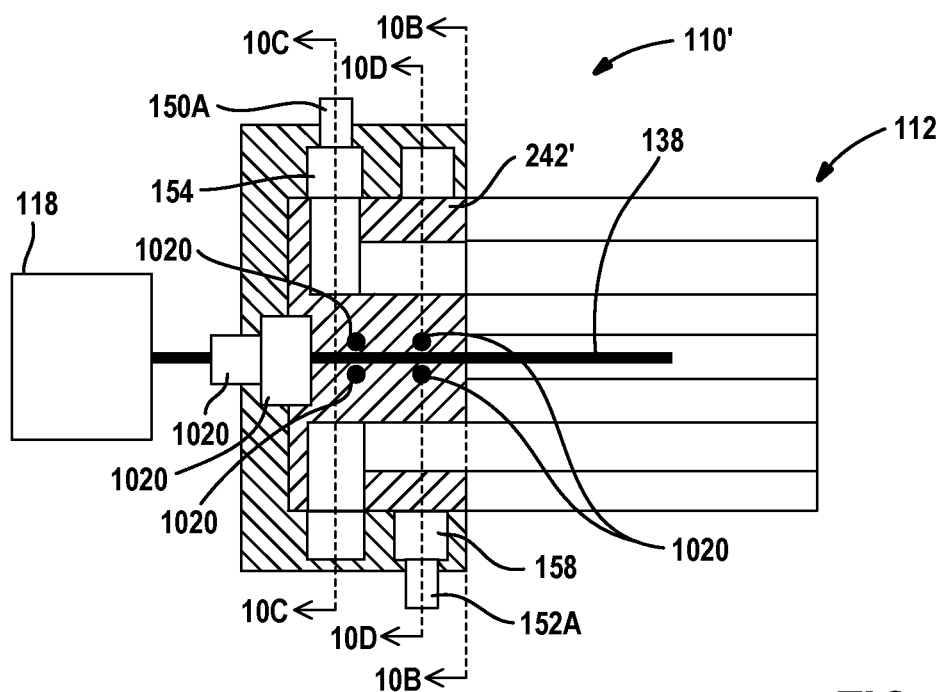
FIG. 10A is a cross-sectional view of one end of the fluid to fluid pressurizer having an alternate rotary valve plate configure.
Figure 10B:
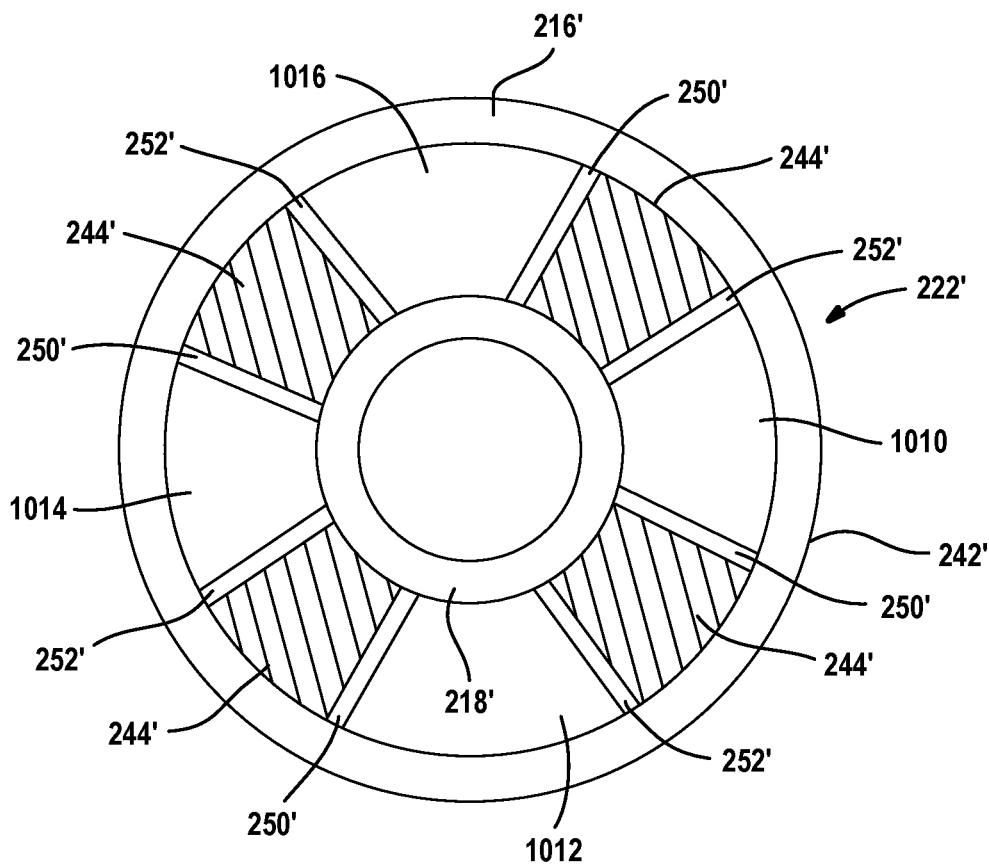
FIG. 10B is a side view of the alternate configuration for the rotary valve plate.

Referring now to FIG. 10A, a second example of a fluid to fluid pressurizer 110' is illustrated. In this example, the rotary valve plate 242' is modified from the valve plates illustrated previously. As is best illustrated in FIG. 10B, the face 222' of the rotary valve plate 242' is illustrated. In this example, valve ports 1010, 1012, 1014 and 1016 are formed in the face 222'. The ports 1010-1016 are spaced 90° apart because four ports are used. Between each of the valve ports 1010-1016, four sealing areas 244' are provided. Each of the sealing areas 244' have a first radial sealing edge 250' and a second radial sealing edge 252' which can be configured as illustrated in FIGS. 7C-7F. The valve ports 1010-1016 are also defined by annular outer walls 216' and annular inner wall 218'.

In the example set forth in FIGS. 7C-7E, one of the ports 258 and 260 are exposed to high pressure while the other is exposed to low pressure. This provides an uneven axial load on the rotary valve plate as it rubs against the stator.

Referring now to FIGS. 10A-10D, two pairs of opposing ports 1010-1016 are provided. That is, port 1010 and 1014 are opposite each other while ports 1012 and 1016 are opposite each other. Improved results may be obtained when the number of ports are evenly divisible by 4. That is, 4, 8, 12 and 16 are suitable examples of the number of ports. Various design considerations are used when selecting a number of ports.

Parallelism between the face 222' of the rotary valve plate 242' and the face of the stator 112 is important for the seals to be formed. A high degree of flatness is desired to be manufactured into the surfaces. Compliant supports 1020 may be used to allow a slight angular adjustment to the shaft 138. In this example, the compliant supports 1020 are O-rings. An alternate example is that the rotary valve plates may be mounted on a split shaft that allows axial movement and some angular adjustment relative to the face of the stator.

Figure 10C:
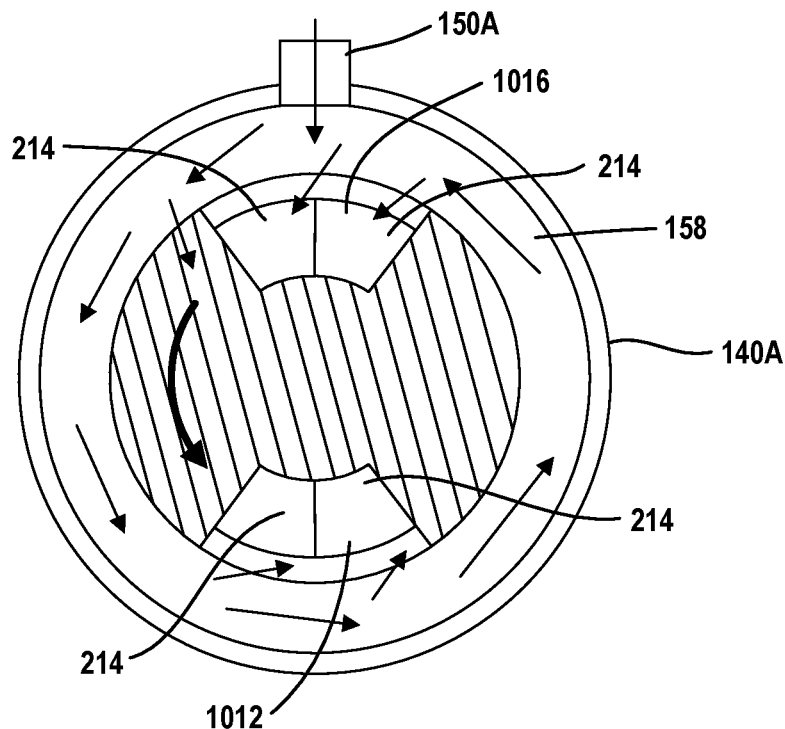
FIG. 10C is a cross-sectional view of FIG. 10A through the input showing the alternate design for the rotary valve plate.
Figure 10D:
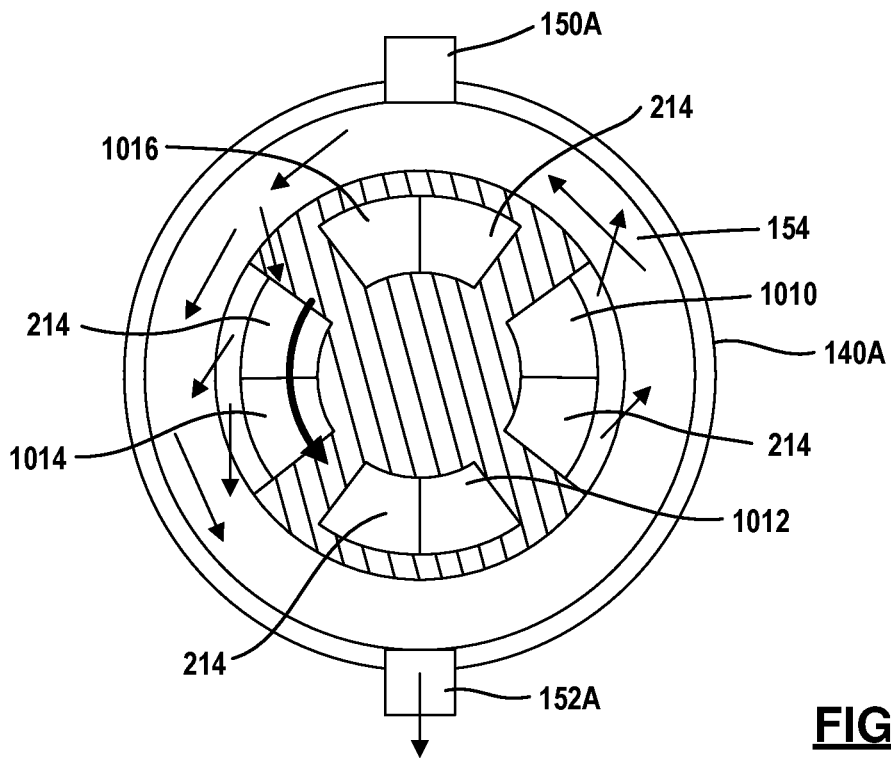
FIG. 10D is a cross-sectional view of the design having an alternate rotary plate through the fluid outlet.

FIGS. 10C and 10D are cross-sectional views through the fluid inlet 150A and the fluid outlet 152A of the rotor housing 140A. A portion of the flow channels 214 are visible through the valve ports 1010-1016.

Figure 11A:
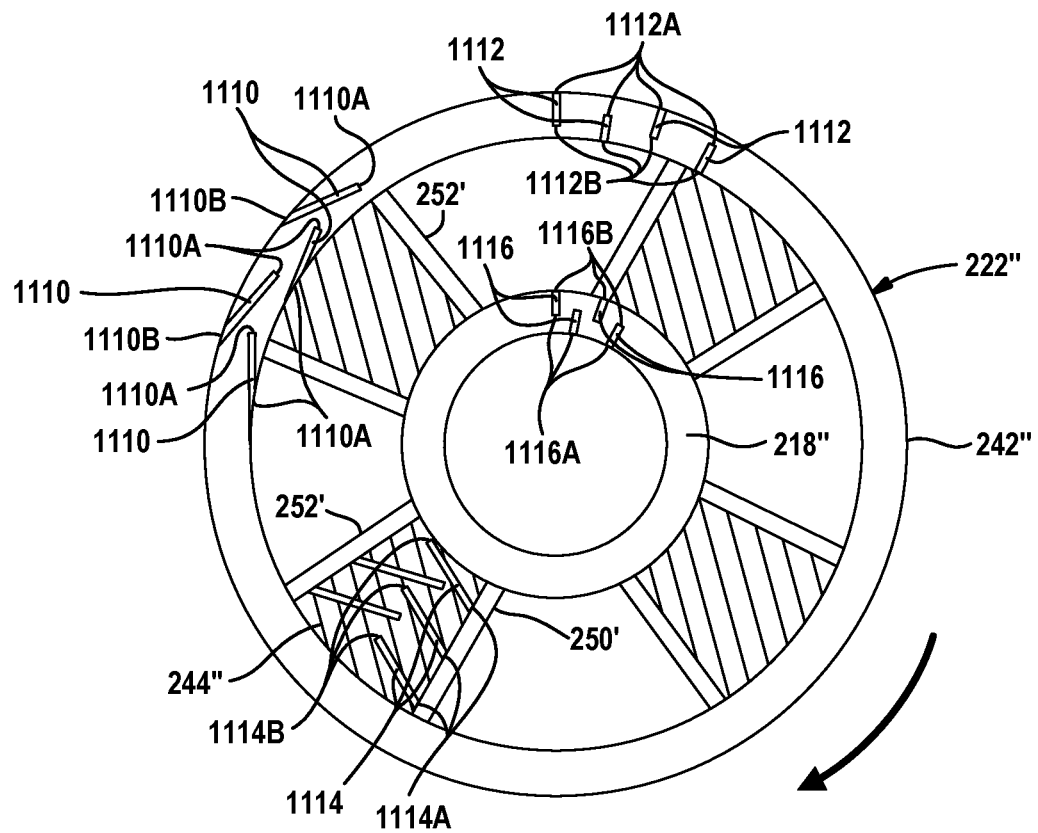
FIG. 11A is a side view of an alternate design for a rotary valve plate having grooves therein.

Referring now to FIG. 11A, it has been found that providing a smaller amount of lubricating fluid may extend the operating time without creating unacceptable leakage. In FIG. 11A, the face 222" has been modified to include lubrication grooves that may be positioned on different parts of the face 222". The lubrication grooves set forth below are examples of different positions and directions of the lubrication grooves. One or more of the different sets of lubrication grooves may be used in various examples. The annular outer wall 216 may have angular grooves 1110 formed therein. The angular grooves 1110 have a first end 1110A that extends from the outer edge of the annular outer wall 216". In a radial direction, the ends 1110B of the grooves 1110 overlap. Thus, when the rotary valve plate 242" rotates, lubricating fluid is placed within the grooves and a path across the entire annular outer wall 216" is lubricated.

In addition to, or instead of, the angular grooves 1110, radial grooves 1112 may also be used. The radial grooves have a first end 1112A adjacent the edge of the annular outer wall 216". The inner edge extends inward greater than the second end 1112B of an adjacent radial groove. Again, the ends of the grooves 1112 are radially overlapping in a similar manner to those of grooves 1110.

Seal face grooves 1114 having a first end 1114A and a second end 1114B may be disposed on one or more of the seal faces 244". These grooves are also radially overlapping and extend from the first radially sealing edge 250' to the second radially sealing edge 252'.

The annular inner walls 218" has been modified with radially extending grooves 1116. The radially extending grooves extend from an outer edge of the annular inner wall 218" and from the inner edge of the annular inner wall 218".

In each case as mentioned above, the angular grooves 1110 may cover a portion or all of the annular outer wall 216".

The face of the rotary valve plate and the face of the stator must rub together so that a seal is provided and fluid is transferred from the slow channels into and out of the fluid inlets and outlets. However, the force must not be too great or too little. High drag is also undesired and may result in a high amount of wear.

Figure 12:
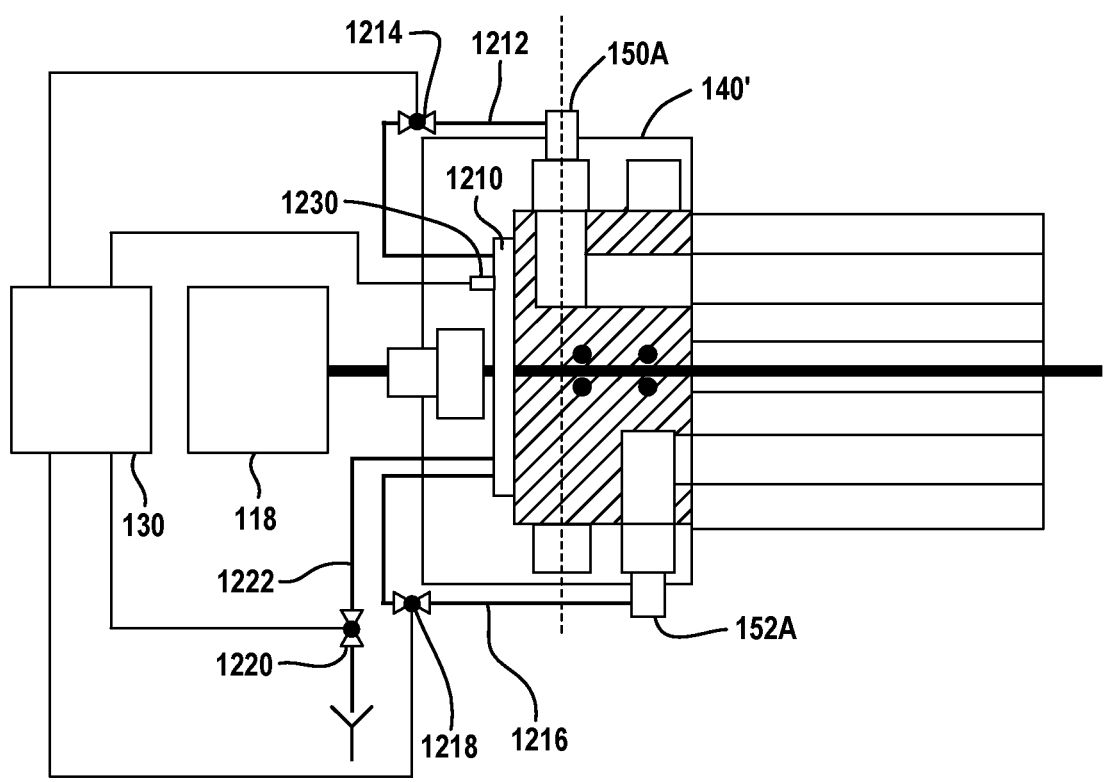
FIG. 12 is a cross-sectional view of an alternate rotor housing having a fluid pressure chamber therein.

Referring now to FIG. 12, a chamber 1210 is provided to provide an axial force on the rotary valve plate 242". By controlling the pressure within the chamber 210, the amount of axial force may be controlled to a desired amount. The chamber 1210 is formed in the rotor housing 140". The chamber 1210 is fluidically coupled to the inlet 150A through a fluid connection 1212. A control valve 1214 is disposed within the fluid connection 1212 and may controllably interrupt or allow fluid from the inlet 150A to the fluid chamber 1210. Likewise, fluid connection 1216 is fluidically coupled from the chamber 1210 to the outlet 152A. The outlet 152A is at a low pressure. A control valve 1218 is used to control the amount of flow from the chamber 1210 to the lower pressure outlet 152A. Another control valve 1220 coupled to the atmosphere through a fluid connection 1222 may also be provided from the chamber 1210. That is, rather than the low pressure outlet 152A, the chamber 1210 may be vented to the atmosphere through the control valve 1120. One or both of the valves 1220 or 1218 may be provided in a system.

The control valve 1214, 1218 and 1220 may be connected to the controller 130. A sensor 1230 provides a sensor signal to the controller 130 to control one or more of the control valves 1214, 1218 or 1220. Of course, all of the valves may be controlled by the controller 130. The sensor 1230 may be a pressure sensor that generates a pressure signal. Likewise, the sensor 1230 may also be a proximity sensor. Of course, other types of sensors may be used to provide feedback as to the position. To provide more pressure into the chamber 1210, the valve 1214 is open and the valves 1218 and 1220 are closed. To reduce the amount of pressure within the chamber 1210, the valve 1214 is closed and one or both of the valves 1218, 1220 are open.

Figure 11B:
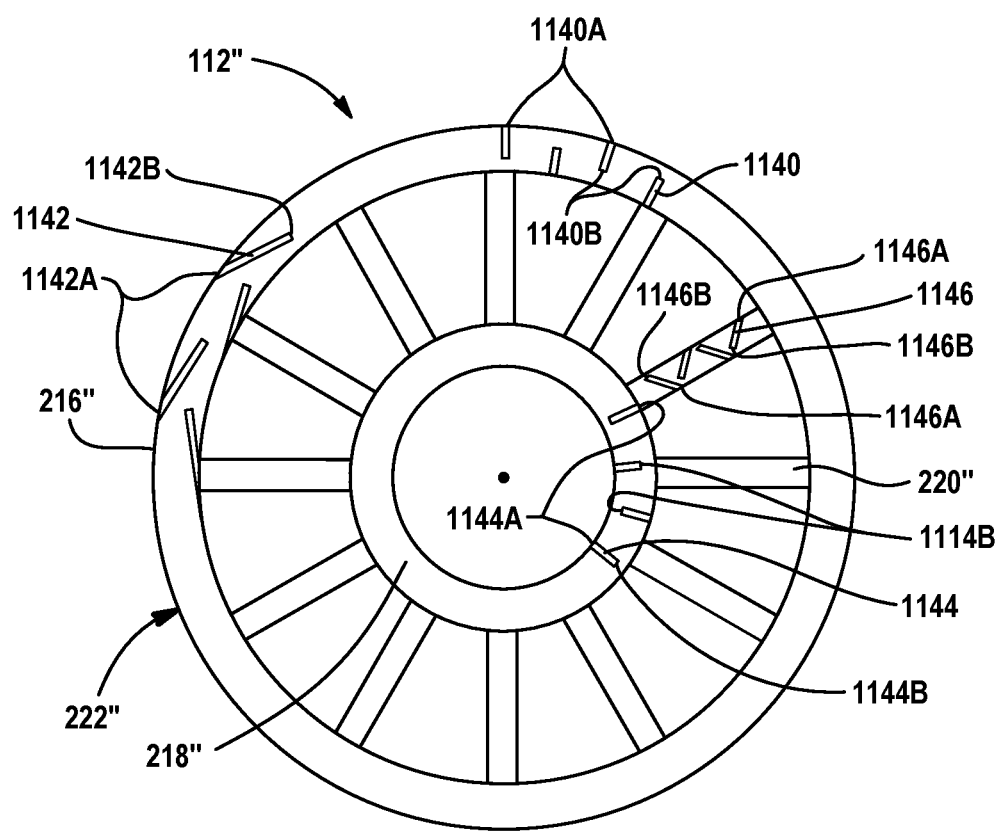
FIG. 11B is a front view of the face of the stator with lubricating grooves thereon.

Referring now to FIG. 11B, a face 222" is illustrated with lubricating grooves similar to the lubricating grooves illustrated in FIG. 11A. In this example, the lubricating grooves are on the face 222" of the stator 112". One or more sets of lubricating grooves may be used. Lubricating grooves 1140 are disposed on the annular outer wall 216". The lubricating grooves may extend partially inward from the outer edge and outward from the inner edge of the wall. A first end 1140A is on the outer edge or inner edge of the annular outer wall 216. The end 1140B is radially inwardly or outwardly, respectively. Adjacent lubricating grooves 1140 radially overlap so that when the rotor spins, lubricating fluid is positioned and maintained between the stator 1112" and the rotor 126".

A second set of lubricating grooves 1142 are disposed angularly and also radially overlap. The angular grooves 1142 are disposed on the annular outer wall 216. A first end 1142A is disposed at the radially outward edge or radially inward edge of the annular outer wall 216". The second end 1142B extends radially inwardly or outwardly, respectively.

The radial walls 220" have angularly extending lubricating grooves 1146. A first end 1146A extends from a first edge and a second end is disposed within the face of the wall. That is, lubricating grooves 1146 extend into the width. Each lateral edge may have lubricating grooves that radially overlap.

The annular inner wall 218 may also have radially extending grooves 1144. A first end of the lubricating grooves extend from one edge of the annular outer wall 216 as end 1140A and a second end extends inward within the thickness of the annular outer wall 216" as end 1140B. The lubricating grooves 1144 may also radially overlap.

Lubricating grooves may be formed on the portions of the rotor or the stator as illustrated in FIGS. 11A and 11B. Lubricating grooves may also be used on either the rotor or the stator. The radially overlapping grooves allow the distribution of lubricating fluid on the faces of the rotating and stationary portions.

Referring now to FIGS. 13A-13E, the example set forth above has a fluid to fluid interface. In the example set forth in FIGS. 13A-13E, a partition 1310 is disposed in each of the flow channels 214A-214D. By providing a physical partition 1310, unavoidable turbulence and diffusion resulting in cross-contamination of the feed and brine streams (in a reverse osmosis system) is avoided. The partition 1310 is shaped to conform to the cross-sectional shape of the flow channels. In the above configuration, the flow channels may be round or arc shaped. However, various other cross-sectional shapes of the flow channels 214A-214D may be formed, such as trapezoidal, square, rectangular, hexagonal or other shapes. A smaller clearance between the wall of the flow channel and the corresponding partition 1310 allows free movement of the partition 1310 according to the appropriate pressures therein. One issue with using partitions is that the exact position is only controlled by the rate flow in a flow channel. If the exact same flow rate is not in each channel, the partition may be positioned in different locations. A first face plate 1320A and a second face plate 1320B may be provided with larger diameter flow channel continuations 1322A, 1322B of the flow channels 214. The larger diameter flow channel continuations 1322A, 1322B allow the partitions 1310 to partially extend from the flow channels 214 and allow fluid thereby.

Figure 13D:
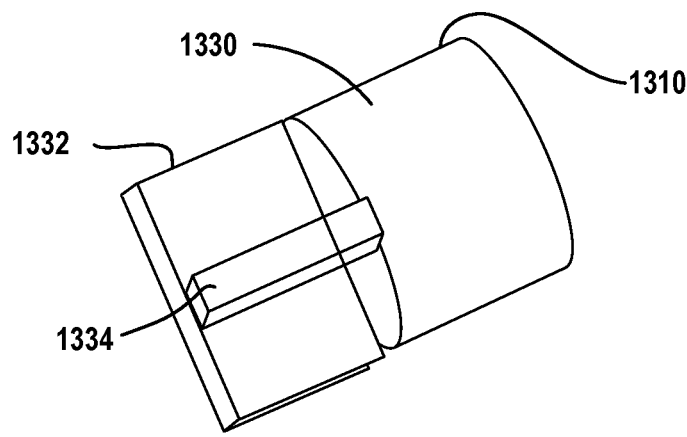
FIG. 13D is a perspective view of a partition.

As is best illustrated in FIG. 13D, the partition 1310 includes a body 1330 and fins 1332, 1334. The fins 1332, 1334, as illustrated, are normal to each other.

Figure 13E:
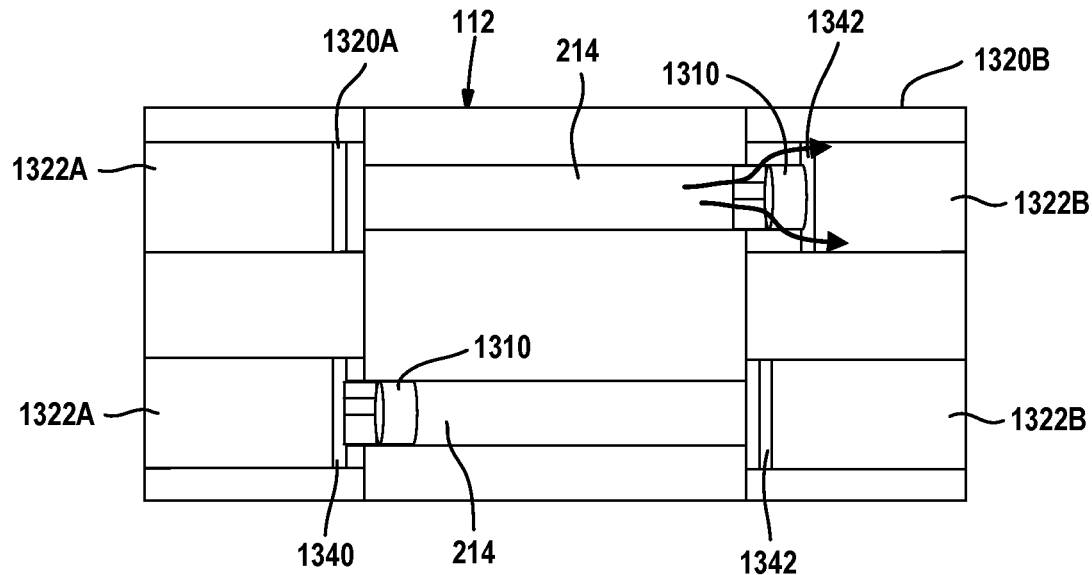
FIG. 13E is a side cutaway view of partitions within flow channels relative to the end plates.

As is best illustrated in FIG. 13E, bars 1340, 1342 are used to prevent the partition 1310 from completely extending from the flow channel 214. In this example, two perpendicularly disposed bars are used. The fins 1332, 1334 allow fluid to pass as shown in the upper position of FIG. 13E. By allowing fluid to pass around the partition 1310, fluid flow is not completely stopped. In certain industrial processes such as reverse osmosis systems, it is desirable to not stop fluid flow. In particular, during the high-pressure fill cycle of a reverse osmosis system, high pressure brine pushing feed to the membrane should not be fully interrupted. The bars 340, 342 may be positioned on the left side of FIG. 13A closer to the flow channels 214 so that the partition does not extend outward therefrom. This allows low pressure feed to be used to positively position the partition at one end of the channel to ensure that there will be ample length of travel during the high-pressure cycle yet the flow is blocked at the low pressure channel to ensure no fluid is unnecessarily lost during the purge cycle. Blocking the low-pressure flow does not cause undue flow disruption nor stress on any of the components therein. The feed pressure during the purge cycle is high enough to allow the partition to be driven all the way to the end of the channel before the high pressure fill cycle begins. One way to perform this is to for the feed pressure being maintained at least one bar higher than the brine discharge pressure. However, more optimal designs may require a lower pressure difference.

The face plates 1320A, 1320B may be made reversible and replaceable. That is, the face plates 1320A, 1320B may be removable attached to the stator 112. Each face of the face plates may be highly precision machined to allow the face plates to be reversed.

Figure 13F:
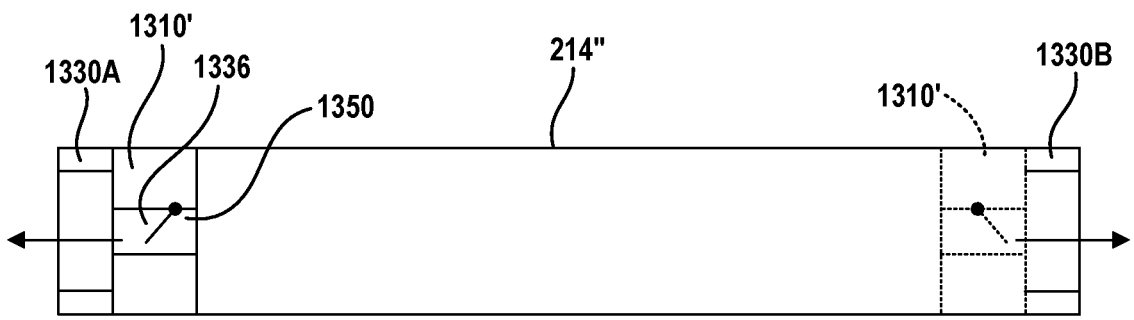
FIG. 13F is a side view of modified flow channels with end stops.

Referring now to FIG. 13F, flow channels 214" are illustrated. The flow channels 204" are modified with end stops 1330A and 1330B located near each end. A partition 1310' moves within the flow channel 214" as illustrated above in FIGS. 13A-13E. However, in this example, the partition 1310' is retained within the flow channels 214". To allow fluid to pass through the partition, a fluid passage 1350 is provided therethrough. A valve 1376 opens when enough fluid pressure builds up within the flow channel 214". That is, the valve 1376 may only open upon a significant differential pressure between the flow channel 214" and the pipes beyond the flow channel 214". In dashed lines, the partition 1332 is shown at the other end with the valve 1376 opened. It should be noted that the valve may open in either direction or set to be opened at one end and remain close at the flow channel 214"

Figure 14A:
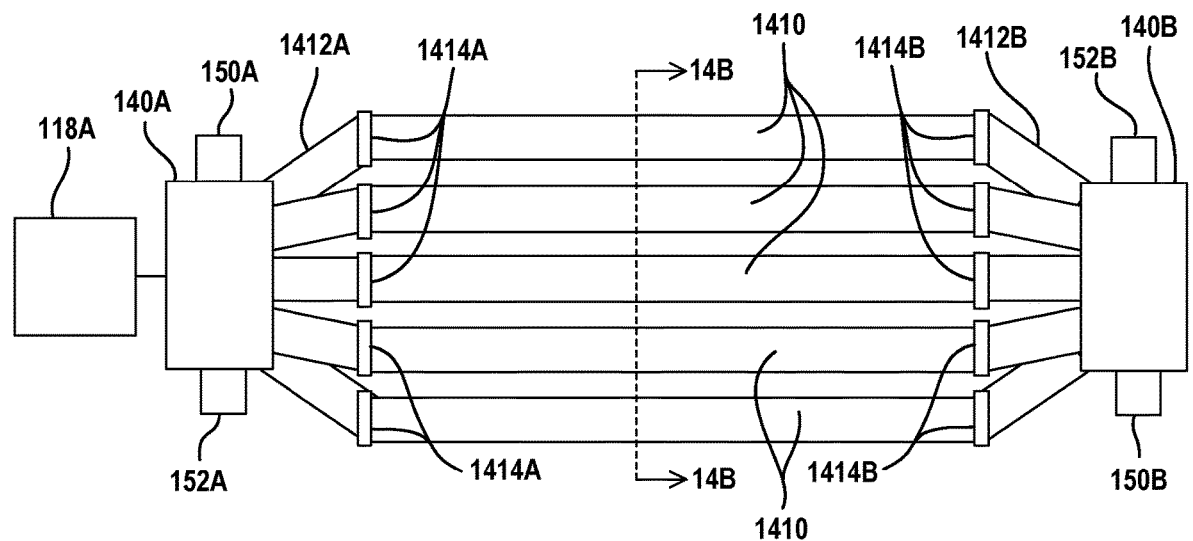
FIG. 14A is an alternate design for the stator having a plurality of pipes.
Figure 14B:
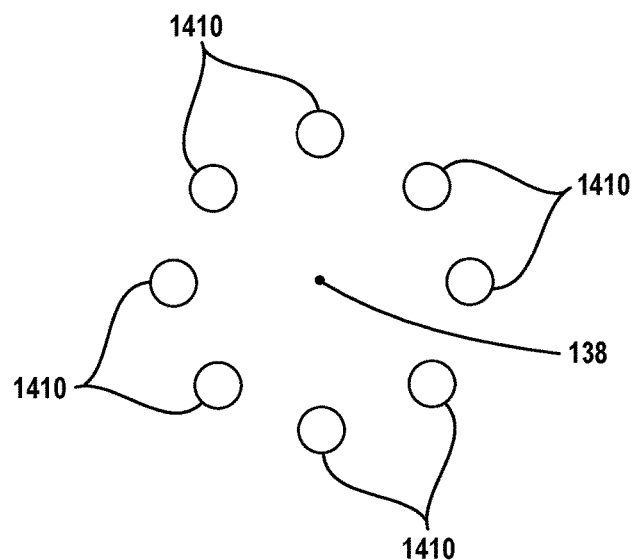
FIG. 14B is a cross-section view of the system of FIG. 14A.

Referring now to FIGS. 14A and 14B, the system is also suitable for very large commercial installations. In this example, the flow channels are replaced by pipes 1410. The pipes 1410 are coupled to manifolds 1412A and 1412B. Pipe joints 1414A and 1414B couple the pipes 1410 to the respective manifolds 1412A, 1412B. Such a configuration allows the pipes 1410 to be replaced when damaged or worn. Longer pipes and larger diameter pipes 1410 may be used in such a system. Thus, a greater amount of pumping per cycle and hence a reduction in the reduction rate may take place. By reducing the rotation rate, the wear of the rotary valve plates may be reduced. Lowering the cycle rate extends the fatigue life of all the components exposed to the varying pressures.

The manifolds 1412A, 1412B are coupled to the rotor housings 140A, 140B at pipe joints 1414A and 1414B.

Figure 15:
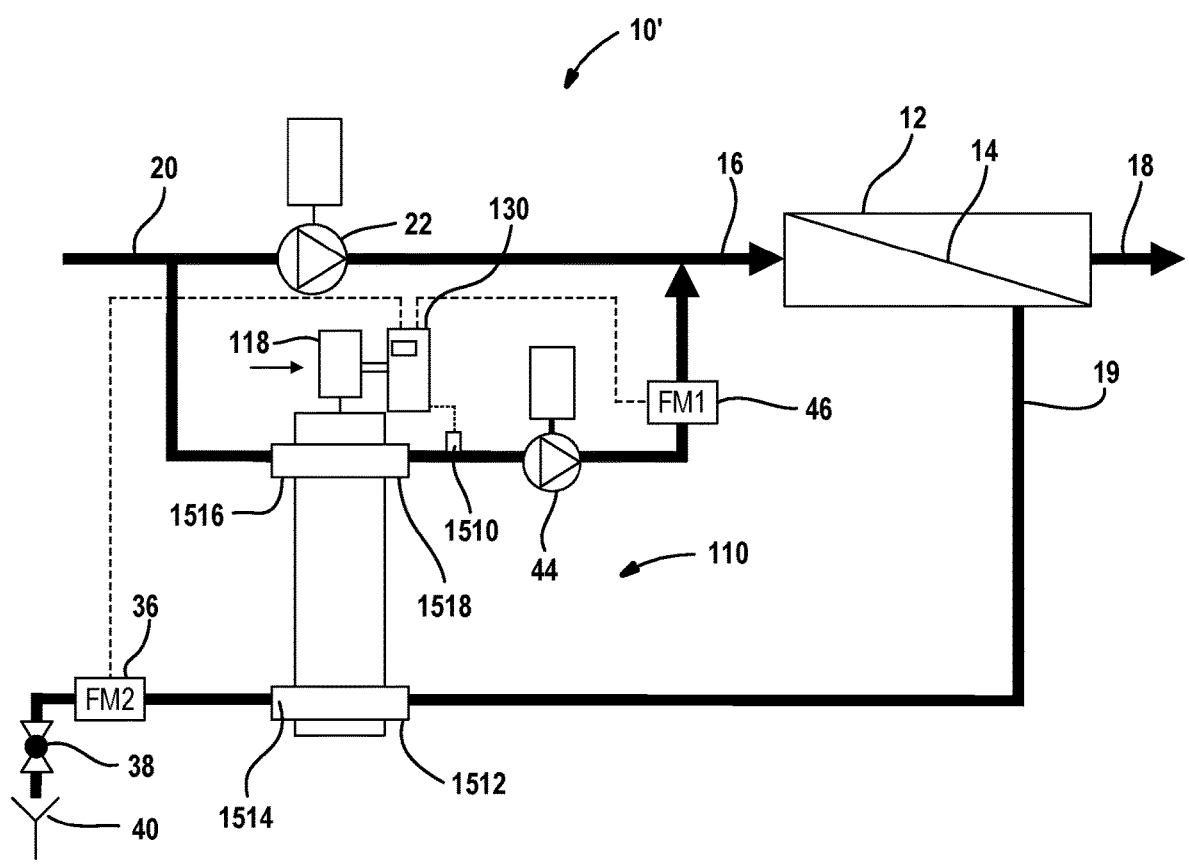
FIG. 15 is a schematic view of a reverse osmosis system having a fluid to fluid pressurizer according to the present disclosure.

The control of the system is to approximately have an equal amount of low pressure feed fluid and high pressure brine entering the unit. The low pressure feed must be equal or slightly greater than the high pressure brine flow and the high pressure brine flow must not be impeded or otherwise changed. The lower pressure feed flow may be varied. In FIG. 15, a reverse osmosis system 10' having similar components as that set forth in FIG. 1 is provided. The same elements are labeled the same. In this example, a fluid to fluid pressurizer 110 according to the present disclosure is provided. In this example, a fluid to fluid pressurizer 110 according to the present disclosure is incorporated therein. Also in this example, the controller 130 may be coupled to a salinity sensor 151 such as a total dissolved solid sensor. The speed of the motor 118 may be changed based upon the bring flow rate as measured by the flow meter 36. By this control, the high pressure brine port rotates away from a given pumping channel for the brine interface or the physical partition can reach the end of the channel. The rotation rate may be calculated based on the dimensions of the pumping channels and the brine flow rate. The motor speed calculation may be performed by the controller 130. A salinity sensor 1510 may be also used to set the motor speed. When the salinity sensor 1510 detects a mixing of high salinity brine with the feed, then the motor speed of the motor 118 may be increased and valve 38 may be opened to increase the feed flow. The pump 44 may also have its speed reduced to reduce the amount of boost provided therefrom to reduce the rate of brine entering the pumping channels.

The fluid to fluid pressurizer 110 has a brine inlet 1512, a brine outlet 1514, a feed fluid inlet 1516 and a feed fluid outlet 1518.

In operation, the high pressure brine fluid inlet 1512 forces the feed fluid in an upward direction and out through the feed fluid outlet 1518 to form high pressure feed fluid by imparting the pressure thereon. As mentioned above, preferably the process brine fluid does not leave the fluid to fluid pressurizer. As the rotors spin, the brine fluid from the flow channels is removed under low pressure by the low pressure feed fluid. The brine fluid is communicated to the drain 540 through the brine outlet 514 under low pressure. The low pressure feed fluid is provided from the feed fluid inlet 1516 which is ultimately communicated to the flow channels and ultimately output through the feed fluid outlet 1518 under pressurization from the brine fluid. The motor or motors rotates the first rotary valve plate and the second rotary vale plate within the first stationary rotor housing and the second stationary rotor housing synchronously. The low pressure feed fluid is pressurized by the high pressure process fluid within the plurality of flow channels to form high pressure feed fluid. The speed of rotating is controlled in response to a sensed condition in the high pressure feed fluid or a high pressure process fluid. As mentioned above, this may be the salinity of the feed fluid or the flow rate of the high pressure brine fluid from the process. The rotation speed may not be continuous but stepped as also mentioned above.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A fluid to fluid pressurizer comprising:
   an elongated stationary portion comprising a plurality of flow channels, said stationary portion comprising a first face at a first end and a second face at a second end;
   a first rotor housing disposed adjacent to the first end of the elongated stationary portion;
   a second rotor housing disposed adjacent the second end of the elongated stationary portion, said first rotor housing and the second rotor housing being stationary;
   each of the first rotor housing and the second rotor housing comprising a fluid inlet fluidically coupled to a first annular channel and a fluid outlet fluidically coupled to a second annular channel;
   each of the first rotor housing and the second rotor housing comprising a first rotary valve plate and a second rotary valve plate respectively, each rotary valve plate comprising an inlet valve port fluidically coupling the fluid inlet to at least a first flow channel of the plurality of flow channels, each rotary valve plate comprising an outlet valve port fluidically coupling a second flow channel to the plurality of flow channels to the second annular channel; the first rotary valve plate comprising a first sealing surface adjacent the first face and the second rotary valve plate comprising a second sealing surface adjacent the second face;
   a first annular seal disposed radially between the first rotor housing and the first rotary valve plate, said first annular seal is further disposed longitudinally between the first annular channel and the second annular channel of the first rotor housing;
   a second annular seal disposed radially between the second rotor housing and the second rotary valve plate, said second annular seal is further disposed longitudinally between the first annular channel and the second annular channel of the second rotor housing; and
   a first motor coupled to the first rotary valve plate.

2. The fluid to fluid pressurizer as recited in claim 1 wherein the first rotary valve plate simultaneously couples a first plurality of flow channels to the fluid inlet and the second rotary valve plate simultaneously couples a second plurality of flow channels to the fluid outlet.

3. The fluid to fluid pressurizer as recited in claim 2 wherein the first plurality of flow channels and the second plurality of flow channels are symmetrically opposite about a longitudinal axis of the first rotary valve plate.

4. The fluid to fluid pressurizer as recited in claim 1 further comprising a motor shaft wherein the first motor is coupled to the first rotary valve plate and the second rotary valve plate with the motor shaft.

5. The fluid to fluid pressurizer as recited in claim 1 further comprising a first motor shaft coupling the first motor and the first rotary valve plate and a second motor shaft coupling a second motor to the second rotary valve plate.

6. The fluid to fluid pressurizer as recited in claim 5 wherein the first motor shaft comprises a first encoder generating a first encoder signal and the second motor shaft comprises a second encoder generating a second encoder signal and a motor controller synchronously controlling the first motor and the second motor based on the first encoder signal and the second encoder signal.

7. The fluid to fluid pressurizer as recited in claim 1 wherein the plurality of flow channels are defined by a plurality of radial walls, an inner annular wall and an outer annular wall, said radial walls defining a first width for each of the plurality of flow channels.

8. The fluid to fluid pressurizer as recited in claim 7 wherein the first rotary valve plate comprises a sealing area comprising a first radial sealing edge, a second radial sealing edge having a second width therebetween, said second width equal to or greater than the first width.

9. The fluid to fluid pressurizer as recited in claim 8 wherein the first radial sealing edge comprises a first taper extending therefrom, the first radial sealing edge comprising an insert formed of a wear resistant material different than a port plate material.

10. The fluid to fluid pressurizer as recited in claim 9 wherein the first taper is linear.

11. The fluid to fluid pressurizer as recited in claim 9 wherein the first taper is curved.

12. The fluid to fluid pressurizer as recited in claim 9 wherein the insert is removable.

13. The fluid to fluid pressurizer as recited in claim 8 wherein the first radial sealing edge comprises a trailing edge and the second radial sealing edge comprises a leading edge, wherein the second radial sealing edge comprises a second taper.

14. The fluid to fluid pressurizer as recited in claim 8 wherein the first rotary valve plate comprises a pair of oppositely disposed sealing areas comprising a first area.

15. The fluid to fluid pressurizer as recited in claim 8 wherein the sealing area comprises four diametrically opposite and evenly spaced apart sealing areas.

16. The fluid to fluid pressurizer as recited in claim 8 wherein the sealing area comprises a plurality of groups of four diametrically opposite and evenly spaced apart sealing areas.

17. The fluid to fluid pressurizer as recited in claim 8 wherein the first rotary valve plate comprises a first annular sealing portion, a second annular sealing portion spaced apart from the first annular sealing portion, said first radial sealing edge and said second radial sealing edge extending between the first annular sealing portion and the second annular sealing portion.

18. The fluid to fluid pressurizer as recited in claim 17 wherein the first annular sealing portion comprises a plurality of radially overlapping grooves.

19. The fluid to fluid pressurizer as recited in claim 18 wherein the plurality of radially overlapping grooves are radially extending.

20. The fluid to fluid pressurizer as recited in claim 18 wherein the plurality of radially overlapping grooves are disposed at angles relative to a radius.

21. The fluid to fluid pressurizer as recited in claim 18 wherein the plurality of radially overlapping grooves are one millimeter deep or less.

22. The fluid to fluid pressurizer as recited in claim 8 wherein the sealing area comprises a plurality of grooves disposed thereon.

23. The fluid to fluid pressurizer as recited in claim 22 wherein the sealing area comprises a first set of grooves extending from the first radial sealing edge toward the second radial sealing edge and a second set of grooves extending from second radial sealing edge toward the first radial sealing edge.

24. The fluid to fluid pressurizer as recited in claim 1 wherein the first rotor housing further comprises a chamber disposed adjacent to the first rotary valve plate, the chamber fluidically coupled to the fluid inlet through a first control valve and wherein the chamber is fluidically coupled to the fluid outlet through a second control valve, a controller coupled to the first control valve and the second control valve controlling a fluid pressure within the chamber.

25. The fluid to fluid pressurizer as recited in claim 24 wherein the fluid pressure within the chamber provides an axial force on the first rotary valve plate toward the elongated stationary portion.

26. The fluid to fluid pressurizer as recited in claim 1 wherein the plurality of flow channels comprises a first flow channel end portion having a first cross sectional area a second flow channel end portion having a second cross sectional area and a middle flow channel portion having a third cross sectional area, said middle cross sectional area less than the first cross sectional area and the second cross sectional area.

27. The fluid to fluid pressurizer as recited in claim 26 wherein the middle flow channel portion comprises a movable partition disposed therein.

28. The fluid to fluid pressurizer as recited in claim 27 wherein the first flow channel end portion comprises a partition stop spaced apart from the middle flow channel portion allowing the movable partition to partially extend therefrom.

29. The fluid to fluid pressurizer as recited in claim 26 wherein the first flow channel end portion comprises a first partition stop disposed in the first flow channel end portion and a second partition stop disposed in the second flow channel end portion.

30. The fluid to fluid pressurizer as recited in claim 29 wherein the first partition stop is disposed closer to the middle flow channel portion than the second partition stop.

31. The fluid to fluid pressurizer as recited in claim 29 wherein the middle flow channel portion comprises a movable partition having a first end position adjacent to the second partition stop, wherein in the first end position, fluid flow through the flow channel is blocked and, in the second end position, fluid flow through the flow channel is partially blocked.

32. The fluid to fluid pressurizer as recited in claim 26 wherein the elongated stationary portion comprises a first removable faceplate and a second removable faceplate.

33. The fluid to fluid pressurizer as recited in claim 26 wherein the first flow channel end portion is disposed in a first removable faceplate and the second flow channel end portion is disposed in a second removable faceplate.

34. The fluid to fluid pressurizer as recited in claim 27 wherein the moveable partition comprises a guide fin.

35. The fluid to fluid pressurizer as recited in claim 1 wherein the plurality of flow channels comprises a plurality of pipes coupled to a first pipe manifold and a second pipe manifold.

36. The fluid to fluid pressurizer as recited in claim 35 wherein the plurality of pipes are coupled to the first pipe manifold at a plurality of pipe joints.

37. The fluid to fluid pressurizer as recited in claim 35 wherein the first rotor housing is coupled to the first pipe manifold.

38. A reverse osmosis system comprising:
  a membrane chamber having a feed fluid inlet, a permeate outlet and brine outlet;
  a fluid to fluid pressurizer as recited to claim 1 wherein the first rotor housing is fluidically coupled to the feed fluid inlet of the membrane chamber and the second rotor housing is coupled to the brine outlet;
  a first flow rate sensor generating a brine flow rate signal; and
  a controller coupled to the first flow rate sensor and controlling a speed of the first motor in response to the brine flow rate signal.

39. The reverse osmosis system as recited in claim 38 further comprising a salinity sensor coupled to a fluid outlet of the first rotor housing generating a salinity signal corresponding to a salinity of the fluid from the fluid outlet;
  the controller coupled to the first motor and the salinity sensor, said controller controlling a motor speed of the first motor in response to the salinity signal.

40. A method of operating a fluid to fluid pressurizer having
  an elongated stationary portion comprising a plurality of flow channels, a first face at a first end and a second face at a second end,
  a first stationary rotor housing disposed adjacent to the first end of the elongated stationary portion and comprising a first rotary valve plate therein,
  a second stationary rotor housing disposed adjacent the second end of the elongated stationary portion comprising a second rotary valve plate therein, said method comprising:
  communicating low pressure feed fluid to the fluid to fluid pressurizer,
  communicating high pressure process fluid to the fluid to fluid pressurizer,
  rotating the first rotary valve plate and the second rotary valve plate within the first stationary rotor housing and the second stationary rotor housing synchronously so that low pressure feed fluid is pressurized by the high pressure process fluid within the plurality of flow channels to form high pressure feed fluid; and
  controlling a speed of rotating in response to a sensed condition in the high pressure feed fluid or a high pressure process fluid.

41. The method of claim 40 wherein controlling the speed of rotating comprises controlling the speed of rotating in response to a salinity of the high pressure feed fluid.

42. The method of claim 40 wherein controlling the speed of rotating comprises controlling the speed of rotating in response to a flow rate of the high pressure process fluid.

43. The method of claim 40 wherein rotating the first rotary valve plate and the second rotary valve plate within the first stationary rotor housing and the second stationary rotor housing synchronously comprising rotating the first rotary valve plate and the second rotary valve plate within the first stationary rotor housing and the second stationary rotor housing synchronously based on a signal from a first encoder and a second encoder.

\* \* \* \* \*